US011748885B2

(12) United States Patent
Zhou et al.

(10) Patent No.: US 11,748,885 B2
(45) Date of Patent: Sep. 5, 2023

(54) METHODS AND SYSTEMS FOR ANALYZING TIME ORDERED IMAGE DATA

(71) Applicant: Ludwig Institute for Cancer Research Ltd, Zurich (CH)

(72) Inventors: Felix Zhou, Oxford (GB); Xin Lu, Oxford (GB); Carlos Ruiz-puig, Oxford (GB); Jens Rittscher, Oxford (GB)

(73) Assignee: Ludwig Institute for Cancer Research Ltd, New York, NY (US)

( * ) Notice: Subject to any disclaimer, the term of this patent is extended or adjusted under 35 U.S.C. 154(b) by 119 days.

(21) Appl. No.: 16/754,819

(22) PCT Filed: Oct. 12, 2018

(86) PCT No.: PCT/GB2018/052935
§ 371 (c)(1),
(2) Date: Apr. 9, 2020

(87) PCT Pub. No.: WO2019/073252
PCT Pub. Date: Apr. 18, 2019

(65) Prior Publication Data
US 2021/0192737 A1 Jun. 24, 2021

(30) Foreign Application Priority Data
Oct. 13, 2017 (GB) .................................... 1716893

(51) Int. Cl.
*G06T 7/00* (2017.01)
*G06T 7/285* (2017.01)
*G06T 7/246* (2017.01)
(52) U.S. Cl.
CPC ............ *G06T 7/0016* (2013.01); *G06T 7/248* (2017.01); *G06T 7/285* (2017.01); *G06T 2207/10021* (2013.01); *G06T 2207/10028* (2013.01); *G06T 2207/30024* (2013.01)

(58) Field of Classification Search
CPC ....... G06T 7/0016; G06T 7/248; G06T 7/285; G06T 2207/10021; G06T 2207/10028;
(Continued)

(56) References Cited

U.S. PATENT DOCUMENTS 5,611,000 A  3/1997  Szeliski et al.
5,982,909 A * 11/1999  Erdem ................... G06T 7/251
                                                        382/241

(Continued)

OTHER PUBLICATIONS

Amat, Fernando, et al. "Fast, accurate reconstruction of cell lineages from large-scale fluorescence microscopy data." Nature methods 11.9 (2014): 951-958.https://www.nature.com/articles/nmeth.3036?ref=https://githubhelp.com (Year: 2014).*

(Continued)

*Primary Examiner* — John Villecco
*Assistant Examiner* — Han Hoang
(74) *Attorney, Agent, or Firm* — Fox Rothschild LLP

(57) ABSTRACT

A method for characterising motion of one or more objects in a time ordered image dataset comprising a plurality of time ordered data frames, the method comprising: selecting a reference data frame from the plurality of time ordered data frames (210); extracting a plurality of image patches from at least a part of the reference data frame (220); identifying a location of each image patch of at least a subset of the plurality of image patches in each data frame (230); defining, based on the identified locations, a mesh for each data frame, wherein vertices of each mesh correspond to respective identified locations of image patches in the corresponding data frame (240); and deriving, from the meshes, a motion signature for the time ordered image dataset, the motion signature characteristic of the motion of the one or more objects in the plurality of time ordered data frames (250).

40 Claims, 18 Drawing Sheets

(58) Field of Classification Search
CPC ........... G06T 2207/30024; G06T 7/223; G06T 2207/10016; G06T 2207/20021; G06T 7/0014

See application file for complete search history.

(56) References Cited

U.S. PATENT DOCUMENTS

2010/0266182 A1* 10/2010 Grass .................. G06T 7/251
382/131
2018/0247425 A1* 8/2018 Tian ..................... G06T 7/13

OTHER PUBLICATIONS

Petitjean, Laurence, et al. "Velocity fields in a collectively migrating epithelium." Biophysical journal 98.9 (2010): 1790-1800. https://www.sciencedirect.com/science/article/pii/S0006349510001748 (Year: 2010).*

Das, Tamal, et al. "A molecular mechanotransduction pathway regulates collective migration of epithelial cells." Nature cell biology 17.3 (2015): 276-287.https://www.nature.com/articles/ncb3115 (Year: 2015).*

Farnebäck, Gunnar. "Two-frame motion estimation based on polynomial expansion." Scandinavian conference on Image analysis. Springer, Berlin, Heidelberg, 2003.https://link.springer.com/content/pdf/10.1007%2F3-540-45103-X_50.pdf (Year: 2003).*

Brinda Prasad et al., "A real-time multiple-cell tracking platform for dielectrophoresis (DEP)-based cellular analysis", Measurement Science and Technology, IOP, Bristol, GB, vol. 16, No. 4, Apr. 2005, pp. 909-924.

Felix Yuran Zhou et al., "Motion Sensing Superpixels (MOSES): a systematic framework to quantify and discover cellular motion phenotypes", bioRxiv, Jan. 2018.

* cited by examiner

Definition of Boundary Formation Index

Step 1: Build spatial saliency heat map

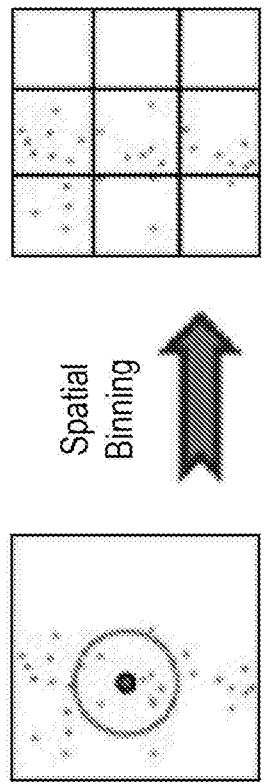
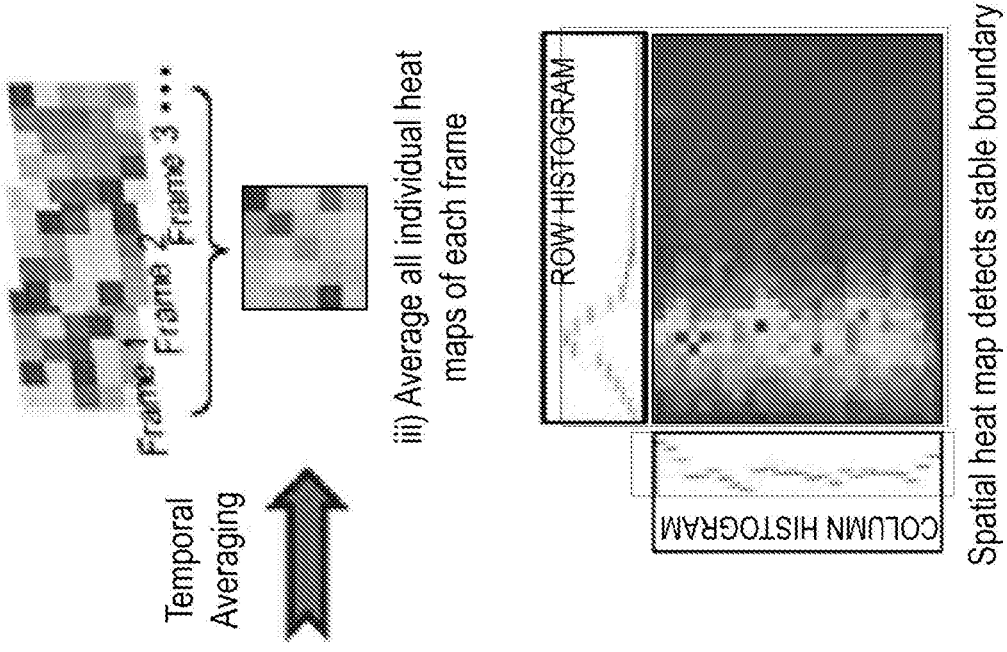

i) For each superpixel, count number of superpixels in given radial distance ii) Aggregate counts in larger spatial area to generate heat map iii) Average all individual heat maps of each frame Spatial Binning Temporal Averaging Spatial heat map detects stable boundary Step 2: Compute normalised signal-to-noise ratio From spatial heat map, define

BOUNDARY FORMATION INDEX:

$$\frac{\text{Mean High Values} - \text{Mean Low values}}{\text{Mean High Values}}$$

Fig. 3

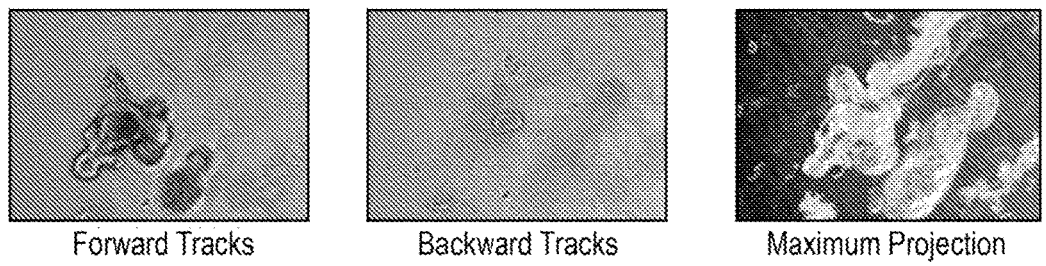
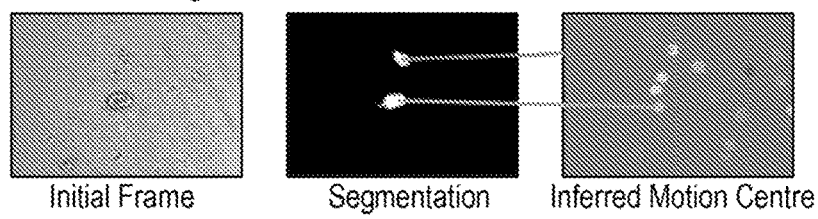
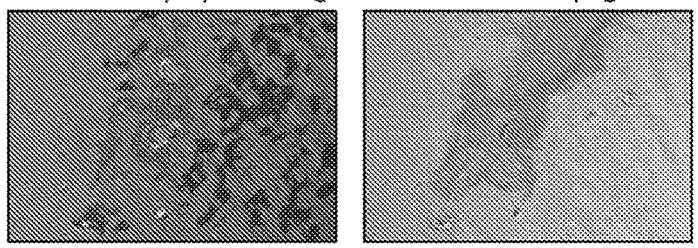
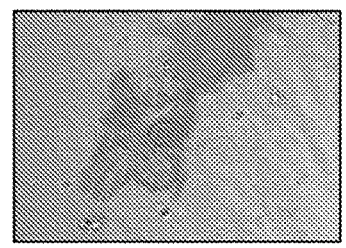
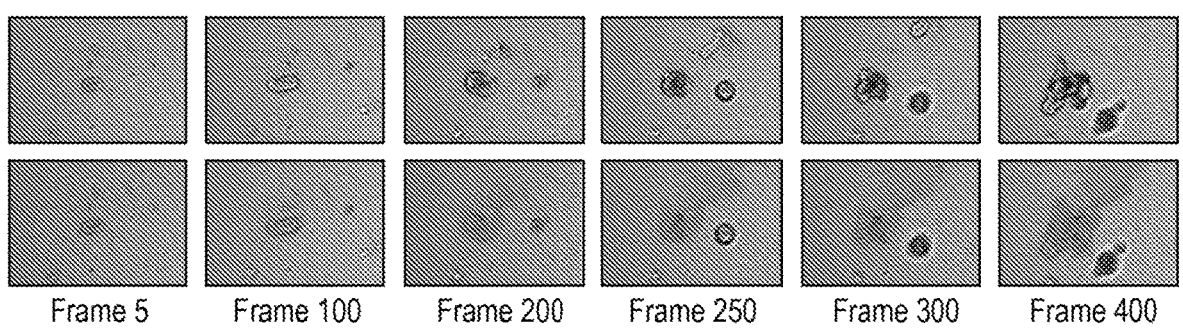
Fig. 11

A     Definition of Mesh Strain Vector

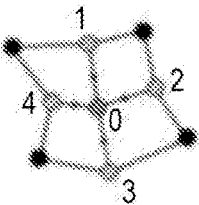

The mesh strain vector for a given 'query' superpixel is the vector sum of all the displacement vector to each neighbouring superpixel e.g. the mesh strain vector for the query superpixel on the left is:

● 'Query' Superpixel
● 'Neighbour' Superpixel
● 'Other' Superpixel

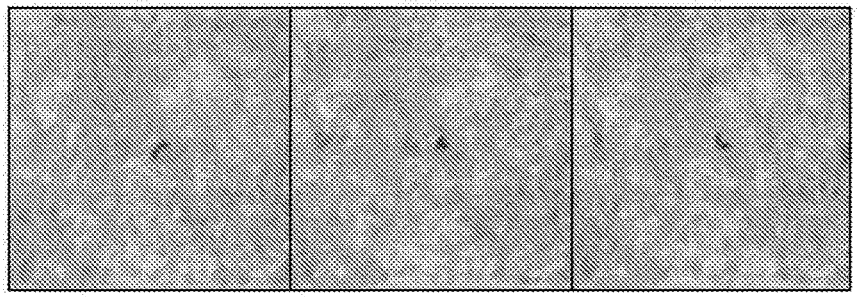

B     Mesh Strain vs Velocity Vector

*Velocities are noisy for low speeds*

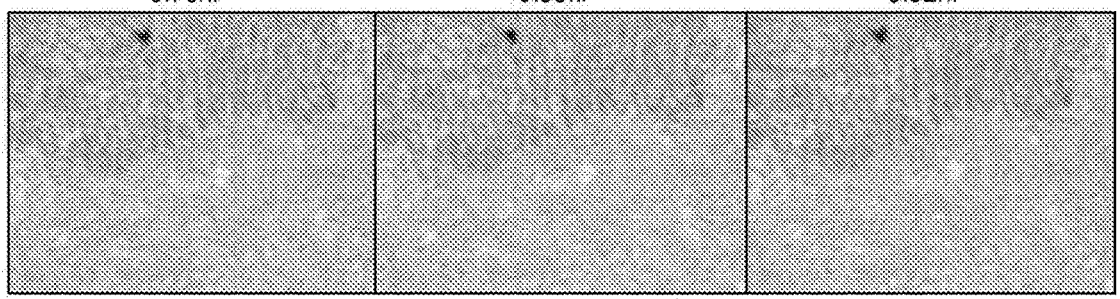

*Red Arrows : Superpixel velocity vector field*     *Green Arrows : Mesh strain vector field*
*Blue Arrow : Average velocity vector*     *Black Arrow : Average mesh strain vector*

Fig. 15

METHODS AND SYSTEMS FOR ANALYZING TIME ORDERED IMAGE DATA

TECHNICAL FIELD

The present disclosure concerns imaging methods, apparatuses and systems. In particular, the present disclosure concerns methods for analysing the individual and collective motion of one or more objects in time ordered datasets such as a plurality of time ordered images.

BACKGROUND

Correct cell population interactions and motion dynamics are important in tissue development and homeostasis. This tissue development and homeostasis requires coordinated collective cellular motion. For example, in conditions such as wound healing, immune and epithelial cells need to proliferate and migrate. Deregulation of key signalling pathways in pathological conditions, including cancer, causes alterations in cellular motion properties which are critical for disease development and progression leading to invasion and metastasis.

If one is able to identify how pharmaceuticals or other internal or external stimuli and treatments affect the motions and interactions of cells, then advances in treating possible diseases may be made. However, it is difficult to quantitatively measure and analyse the dynamics of individual cells and cell populations.

It is an object of embodiments of the invention to provide improved methods for quantitatively measuring and characterising cellular motion.

SUMMARY

The inventors have recognised that many benefits can arise from analysing motion in biological systems such as cell sheets or organoids and have developed methods and apparatuses suitable for such analysis. Although much of the following description relates to the analysis of collective cellular motion or to the analysis of organoid development, as will be appreciated by the skilled person, the methods and apparatuses described herein are useful far beyond these contexts and can be used to analyse the motion of other objects, for example other biological processes, traffic on a road, crowd flows and so on.

The inventors have recognised that a suitable computer-implemented method for studying tissue level (or other) dynamics, including in a medium- or high-throughput manner, should be: (i) robust, i.e. able to handle inevitable variations in image data acquisition and experimental protocol; (ii) sensitive, i.e. able to detect motion differences resulting from small changes in environment or stimuli with a minimum number of replicates; (iii) automatic, not requiring manual intervention except from the initial setting of parameters; and (iv) unbiased, able to characterise motion (e.g. as a motion 'signature') with minimal assumptions about motion behaviour. The methods described herein satisfy all of these criteria.

According to an aspect of the present invention, a method is provided for characterising motion of one or more objects in a time ordered image dataset. The time ordered image dataset comprises a plurality of time ordered data frames. The method comprises selecting a reference data frame from the plurality of time ordered data frames. The method further comprises extracting a plurality of image patches from at least a part of the reference data frame. The method further comprises identifying a location of each image patch of at least a subset of the plurality of image patches in each data frame. The method further comprises defining, based on the identified locations, a mesh for each data frame of the plurality of time ordered data frames, wherein vertices of each mesh correspond to respective identified locations of image patches in the corresponding data frame. The method further comprises deriving, from the meshes, a motion signature for the time ordered image dataset, the motion signature characteristic of the motion of the one or more objects in the plurality of time ordered data frames.

In the context of cellular motion, known approaches for analysing cellular motion including vertex models, differential equations, cellular automata and cell tracking have successfully enabled the assessment of specific biological phenomena (such as individual cell motility or stresses between cell-cell contacts) but are limited in scope of application and are difficult to generalise to medium/high content screening. Vertex models, differential equations and cellular automata are founded on prior modelling assumptions that may not be satisfied for arbitrary time-lapse acquisitions. Cell tracking methods rely on the ability to accurately detect individual cells over time based on image segmentation and are easily affected by such factors as plating density, image contrast variations, marker expression, low resolution image capture or occlusion, especially when the filming is over long time periods (e.g. a week). Particle image velocimetry (PIV) can extract motion in dense monolayers but subsequent downstream analysis do not systematically account for variable video quality, collective motion and global phenomena such as boundary formation. Current analyses have only been applied to small video datasets and select cell lines to measure specific properties such as speed.

Advantageously, by characterising the collective motion of one or more objects in a time ordered dataset in a way as described herein, these disadvantages are overcome. Further advantageously, by deriving a motion signature in this way, a time ordered dataset is represented by a signature which is dependent on the collective motion of objects in the dataset. This allows one time ordered dataset to be compared effectively with other time ordered datasets and, as will be demonstrated herein, the underlying dynamics of the objects in the datasets can therefore be effectively compared. This can be very useful for a number of reasons. For example, one may compare the motion signature for a time ordered dataset for which the collective motion of the objects therein is unknown with several other (reference) motion signatures for which the collective motion of the objects therein is known in order to assign the dataset to a particular motion phenotype or class. For example, in the context of cells, one may compare data for a live cell sheet with data for other (reference) cell sheets in order to determine whether the cellular motion in the live cell sheet is indicative of an abnormality or disease.

The reference data frame may be the first data frame of the plurality of time ordered data frames. The reference data frame may be the last data frame of the plurality of time ordered data frames.

The time ordered image dataset may comprise a plurality of time ordered images. The reference data frame may comprise a reference image. The plurality of time ordered images may comprise a video, each image comprising a frame of the video.

The method may comprise identifying at least one location in at least one data frame other than the reference frame wherein the location is not covered by an image patch extracted from the reference data frame; and extracting at least one further image patch from the at least one identified location. The method may still further comprise identifying a location of each image patch of at least a subset of the at least one further image patches in at least one data frame. The method then further comprises defining, based on the identified locations of the image patches and the further image patches, a mesh for each data frame of the plurality of time ordered data frames, wherein vertices of each mesh correspond to respective identified locations of image patches in the corresponding data frame. The method further comprises deriving, from the meshes, a motion signature for the time ordered image dataset, the motion signature characteristic of the motion of the one or more objects in the plurality of time ordered data frames.

Identifying a location of each image patch of at least a subset of the plurality of image patches in each data frame may comprise comparing an image patch in the first data frame with the same image patch in a second frame and, where the image patch is not similar in appearance in the two frames, not identifying a location of the image patch for the first data frame. The second data frame may be the reference data frame. The second data frame may be a frame which immediately precedes or follows the first data frame.

Each image patch may comprise a superpixel.

The method may further comprise capturing the plurality of time ordered images.

The plurality of time ordered images may be a plurality of time ordered images of a living biological cell sheet. The motion signature for the plurality of time ordered images may therefore be characteristic of cellular motion in the living biological cell sheet. The motion signature of the cell sheet may be indicative of disease. The cell sheet may comprise at least two cell types. The cell sheet may comprise epithelial cells.

The one or more objects in the time ordered dataset may comprise one or more organoids. Additionally or alternatively, an image patch may correspond to a respective organoid. The derived motion signature may be indicative of growth of one or more organoids. The motion signature may be indicative of a branching dynamic of one or more organoids.

The time ordered image dataset may comprise a three-dimensional image dataset. Each image patch may comprise a supervoxel.

The time ordered image dataset comprises a multimodality dataset. For example, the multimodality dataset may comprise a video-audio dataset.

Deriving, from the meshes, a motion signature for the time ordered image dataset may comprise calculating, for each mesh, the average displacement of the vertices of the mesh from the corresponding vertices of the reference mesh.

Each mesh may be defined by a respective weighted graph. Each vertex of the respective weighted graph may be connected to each other vertex within its neighbourhood by a corresponding edge. The edge may be weighted by a distance between the vertex and the other vertex. Each vertex of the respective weighted graph may have a corresponding vertex weight.

The vertex weight for each vertex of the respective weighted graph may be defined by the average change, with respect to a reference weighted graph of the reference data frame, in distance between the vertex and each other vertex in its neighbourhood. The neighbourhood of each vertex of the respective weighted graph for each data frame may be the same as the neighbourhood of that vertex in the reference weighted graph of the reference data frame.

Deriving, from the meshes, a motion signature for the time ordered image dataset, may comprise averaging, for each mesh, the vertex weights of all of the vertices of the mesh.

The neighbourhood of each vertex of the respective weighted graph for each data frame may comprise the k nearest vertices to that vertex, wherein k is an integer.

The vertex weight for each vertex of the respective weighted graph may be defined by the number of vertices within the neighbourhood of that vertex.

Deriving the motion signature for the time ordered image dataset may comprise producing a motion saliency map for each image from the defined mesh, the motion saliency map produced by mapping the vertex weights of each vertex of each mesh to the respective identified location of the image patch corresponding to that vertex in each data frame, and temporally averaging over at least a subset of the plurality of time ordered data frames.

Deriving the motion signature may further comprise deriving a boundary formation index from the motion saliency map, the boundary formation index indicative of whether a boundary exists between the two types of cells.

For each of the plurality of time ordered images, edges of the defined mesh may correspond to spatial separations of image patches that are within a predetermined distance of one another in the reference image.

Deriving a motion signature for the plurality of time ordered images may comprise determining a parameter for each of the defined meshes based on a comparison of each defined mesh to the mesh defined for the reference image. Each parameter may comprise an average displacement of the identified locations of image patches in the corresponding image from the identified locations of the image patches in the reference image.

Deriving, from the meshes, a motion signature for the time ordered image dataset may comprise calculating, for each mesh, a mesh strain vector, wherein the mesh strain vector comprises a resultant displacement vector of an image patch after summing all the individual displacement vectors of all neighbouring image patches.

For each of the plurality of time ordered images, edges of the defined mesh may correspond to spatial separations of image patches that are within a predetermined distance from one another in the corresponding image.

Identifying a location of each image patch of at least a subset of the plurality of image patches in each data frame may comprise identifying the location of the at least a subset of image patches based on a mean displacement of image patches calculated from optical flow.

Identifying a location of each image patch of at least a subset of the plurality of image patches in each data frame may comprise identifying the location of the at least a subset of image patches based on a median displacement of image patches calculated from optical flow.

Identifying a location of each image patch of at least a subset of the plurality of image patches in each data frame may comprise identifying the location of the at least a subset of image patches based on a weighted average displacement of image patches calculated from optical flow.

The method may further comprise identifying a first population of image patches; identifying a second population of image patches; matching image patches from the first population with image patches from the second population where they are closer than a predetermined distance; and fitting a line to the matched image patches in order to locate a boundary between the two populations.

The method may further comprise identifying a first population of image patches; identifying a second population of image patches; and computing an equivalent velocity kymograph for the image patches in the first and second populations, wherein a space axis of the kymograph is discretised into finite bins.

According to an aspect of the invention, a computer-readable medium is provided, the computer-readable medium having instructions stored thereon which, when executed by a processor, cause the processor to determine a unique identifier of a transistor device by performing a method as described herein.

The computer program and/or the code for performing such methods may be provided to an apparatus, such as a computer, on the computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

According to an aspect of the invention, an apparatus for characterising motion of one or more objects in a time ordered image dataset comprising a plurality of time ordered data frames is provided. The apparatus comprises a memory. The apparatus further comprises a processor configured to cause the apparatus to carry out a method as described herein. The apparatus may further comprise a camera for capturing a plurality of time ordered images.

According to an aspect of the invention, a method is provided for categorising time ordered image datasets of one or more objects for which a dynamic behaviour is known. The method comprises receiving a plurality of motion signatures, wherein each motion signature of the plurality of motion signatures corresponds to a respective time ordered dataset of one or more objects and is characteristic of a dynamic behaviour of the one or more objects. The method further comprises sorting each motion signature into a motion phenotype group based on the known dynamic behaviour of the one or more objects to which the respective time ordered dataset corresponds.

A "motion phenotype" may be expressed through a motion signature characteristic of the motion of the one or more objects in the plurality of time ordered data frames to which the motion corresponds. Advantageously, by performing a method such as that described above, one may determine patterns or similarities between motion signatures which reflect the underlying dynamics of the objects in the time ordered datasets. For example, when describing cell behaviour, one may establish a link between a particular motion phenotype group and an abnormality of the cells in the corresponding datasets.

Each time ordered image dataset may comprise a plurality of time ordered images. Each plurality of time ordered images may show a corresponding living biological cell sheet for which a cellular motion phenotype is known. Each motion signature corresponding to a respective plurality of time ordered images of a cell sheet may be characteristic of cellular motion in the cell sheet. Sorting each motion signature into a motion phenotype group based on the known dynamic behaviour may comprise sorting each motion signature into a motion phenotype group based on the known cellular motion phenotype to which the respective plurality of time ordered images corresponds.

The one or more objects may comprise one or more organoids.

Receiving a plurality of motion signatures may comprise deriving the motion signatures from the pluralities of time ordered image datasets by performing a method as described herein.

Sorting a motion signature into a motion phenotype group may comprise applying principal components analysis to the motion signature. Sorting the motion signature into a motion phenotype group may comprise mapping the motion signature based on the values of the two or more principal components of the motion signature. Other dimensional reductions may be used. For example, the image datasets may be reduced to a lower dimensional code by training a multilayer artificial neural network, also known as an autoencoder network. An autoencoder is a neural network which learns a transformation that reconstructs the image after a successive set of intermediate 'transformations'. The aim of an autoencoder is to learn a representation (encoding) for a set of data, typically for the purpose of dimensionality reduction and classification.

According to an aspect of the invention a method is provided for classifying a dynamic behaviour of one or more objects in a time ordered image dataset. The method comprises receiving a motion signature corresponding to the time ordered image dataset of the one or more objects, the motion signature characteristic of the dynamic behaviour of the one or more objects in the time ordered image dataset. The method further comprises comparing the received motion signature with a plurality of reference signatures, wherein each reference signature of the plurality of reference signatures corresponds to a respective time ordered image dataset of a respective one or more objects for which a dynamic behaviour is known, each reference signature sorted into a motion phenotype group according to the known dynamic behaviour. The method further comprises determining, from the comparison, whether the received motion signature belongs to a known motion phenotype group.

Advantageously, the method described above allows for one to determine from the motion signature alone, whether or not one or more objects in the time ordered dataset to which that motion signature corresponds exhibits a particular motion phenotype.

The method may further comprise defining a new motion phenotype group if it is determined that the received motion signature does not belong to a known motion phenotype group.

Each time ordered image dataset may comprise a plurality of time ordered images. Classifying a dynamic behaviour of one or more objects may comprise classifying a cellular motion phenotype of a living biological cell sheet. The plurality of time ordered images may comprise a plurality of time ordered images of the cell sheet. The plurality of reference signatures may correspond to a respective plurality of time ordered images of a cell sheet for which a cellular phenotype is known.

Receiving a motion signature may comprise deriving the motion signature from the time ordered image dataset by performing a method as described herein.

Comparing the motion signature with a plurality of reference motion signatures may comprise applying principal components analysis to the motion signature and comparing the principal components with the principal components of the reference motion signature.

According to an aspect of the invention a computer readable medium is provided, the computer readable medium having instructions stored thereon which, when executed by a processor of a computing device, causes the computing device to carry out a method as described herein.

According to an aspect of the invention, an apparatus is provided. The apparatus comprises a memory. The apparatus further comprises a processor configured to execute instructions to cause a method as described herein to be carried out.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention will now be described by way of example only, with reference to the accompanying figures, in which:

FIG. 3 shows an example of a motion signature, in particular the boundary formation index;

FIG. 8A shows violin plots of boundary formation index for different cell combinations in 0% and 5% serum;

FIG. 8B shows violin plots of motion stability index for the same combinations;

FIG. 8C shows the maximum velocity cross-correlation between the two sheets used in

FIG. 8A;

FIG. 11A shows an overview of a pipeline for single organoid motion extraction in the presence of multiple organoids;

FIG. 11B shows an overlay of the final identified motion tracks onto video frames up to the specified video frame number;

FIG. 15 shows the calculation of a mesh strain vector;

Throughout the description and the drawings, like reference numerals refer to like parts.

DETAILED DESCRIPTION

The present invention seeks to provide improved methods for characterising collective motion of one or more objects in a time ordered image dataset, and to provide improved methods for categorising and/or classifying time ordered image datasets. Whilst various embodiments are described below, the invention is not limited to these embodiments, and variations of these embodiments may well fall within the scope of the invention which is to be limited only by the appended claims.

In much of the discussion that follows, reference is made to a systematic motion analysis framework developed by the inventors. The framework is often referred to herein as Motion Sensing Superpixels (MOSES). MOSES was developed by the inventors for robust quantification and analysis of tissue-level dynamics and, in particular, to analyse image data from multiple (time-lapsed) videos of cellular motion. Accordingly, in what follows, reference is often made to videos and/or a plurality of time ordered images. Additionally, image patches of the time ordered images are often referred to as superpixels. The skilled person will, however, appreciate that the description of the MOSES framework is to provide examples of the methods to which this invention relates but should not be seen as limiting. The skilled person would appreciate that the invention is not limited to the MOSES framework—the methods described herein may, for example, be applied to higher dimensional image data. The methods described herein may, for example, be applied in other biological or non-biological settings in which it is desirable to analyse the dynamics of objects in image data. The scope of the invention is limited only by the appended claims.

MOSES does not rely on data-specific optimization of multiple parameters, specific image acquisition requirements or complex model fitting. This computational framework provides a systematic approach to motion extraction, characterisation and motion phenotyping.

Figure 1:
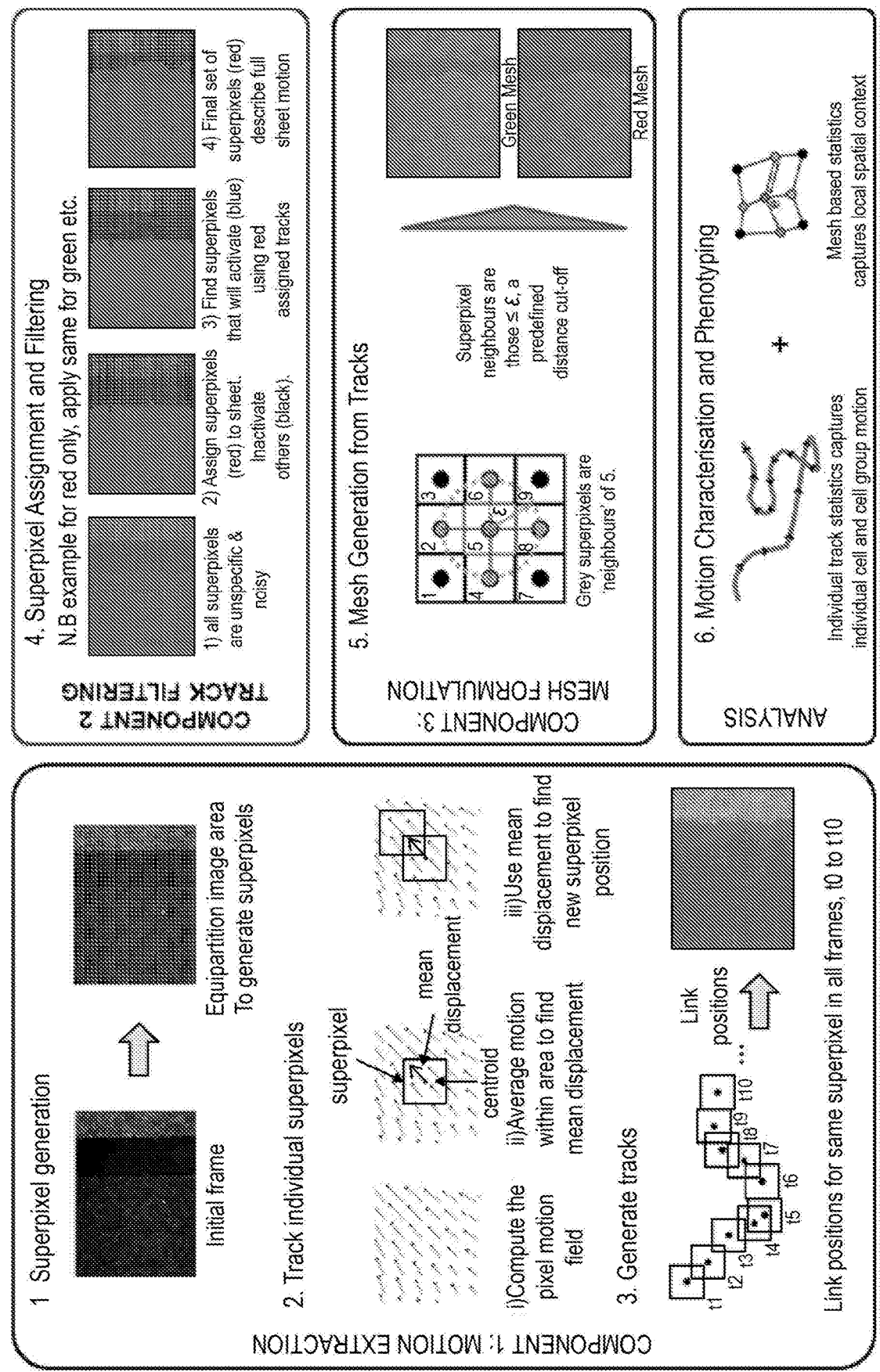
FIG. 1 shows a schematic for a motion phenotyping framework according to an embodiment.

An overview of the Motion Sensing Superpixels (MOSES) framework for motion tracking and analysis is shown in FIG. 1. The MOSES framework is modular and comprises three main stages: (i) motion extraction (see steps 1-3 of FIG. 1), (ii) track filtering and post-processing (see step 4 of FIG. 1), and (iii) motion characterisation and phenotyping (see steps 5 and 6 of FIG. 1).

Motion extraction: Due to the inherently large variations in cell appearance and cell density in a video of cellular motion, for example of a live cell sheet, tracking of individual cells is unreliable. Accordingly, MOSES was designed for global motion extraction using optical flow methods similar to a particle image velocimetry (PIV) approach for analysing monolayers and migrating epithelial fronts without need for image segmentation. The initial frame of a video is divided into a specified number of regular regions/image patches called superpixels; each superpixel is larger than one image pixel (see step 1, FIG. 1). The positions of these superpixels is then updated frame-to-frame, according to the mean displacement calculated from optical flow (see step 2, FIG. 1). A superpixel track is formed by collecting the positions of a superpixel at multiple time points (multiple images of the plurality of images) (see step 3, FIG. 1). The collection of all superpixel tracks summarises all the motion within the video. The number of superpixels used is preferably chosen to sufficiently sub-sample the spatial area of the image to capture all spatial variations in motion. For videos with multiple channels, each channel may be independently tracked in this manner.

Track filtering and post-processing: As the superpixel tracks capture all the motion in the video, some tracks may not be relevant to the phenomenon of interest. Therefore, the second (optional) component of MOSES is the post-filtering of tracks (see step 4, FIG. 1) and is specific to the experimental setup being analysed. Superpixels are assigned so as to cover the entire dynamic motion for each 'object' of interest. To assign superpixels to an object, typically each object is first segmented from the initial video frame to produce a binary image where pixels have value 1 if belonging to the object or 0 otherwise. A superpixel belongs to an object if its centroid lies in a pixel whose value is 1 in the respective binary image. The initial superpixels that cover the object are propagated to improve the estimate of the motion dynamics over the entire movement of the initial superpixels.

Representing motion as dynamic meshes: The third component of MOSES comprises generating a 'dynamic mesh' from the superpixel tracks (see steps 5 and 6 of FIG. 1). After filtering, each superpixel track is linked to its neighbouring superpixel tracks, according to a Euclidean distance cut-off. More precisely, for each image of the plurality of time ordered images, a mesh is defined, vertices of the mesh corresponding to identified locations of the superpixels in the image. As each image of the time ordered images captures properties of the dynamic objects at a respective point in time, the meshes for each image can be compared in order to define what may be thought of as a "dynamic mesh", wherein the mesh for each image can be thought of as the dynamic mesh at a given point in time. This transforms the independent trajectories of each superpixel into a dynamic mesh that naturally assimilates the local collective dynamics. For multichannel videos, a separate dynamic mesh may be produced for each colour channel. Multiple different dynamic meshes can be constructed in such a manner for different purposes, as will become apparent from the description further below. This dynamic mesh formalism is a key property of MOSES. Because the dynamic mesh is a representation of motion that is built from the local spatial relationships of superpixels, robust measures of motion, or motion signatures, can be derived whilst naturally taking into account the relationships between the dynamic objects in the images. It will be shown further below how MOSES may be used to derive motion signatures for videos in order to facilitate easy phenotypic comparisons visually on a two-dimensional plot.

A method for characterising collective motion of one or more objects in a time ordered image dataset will now be described and, by way of example, further information relating to the MOSES framework will also be described.

Figure 2:
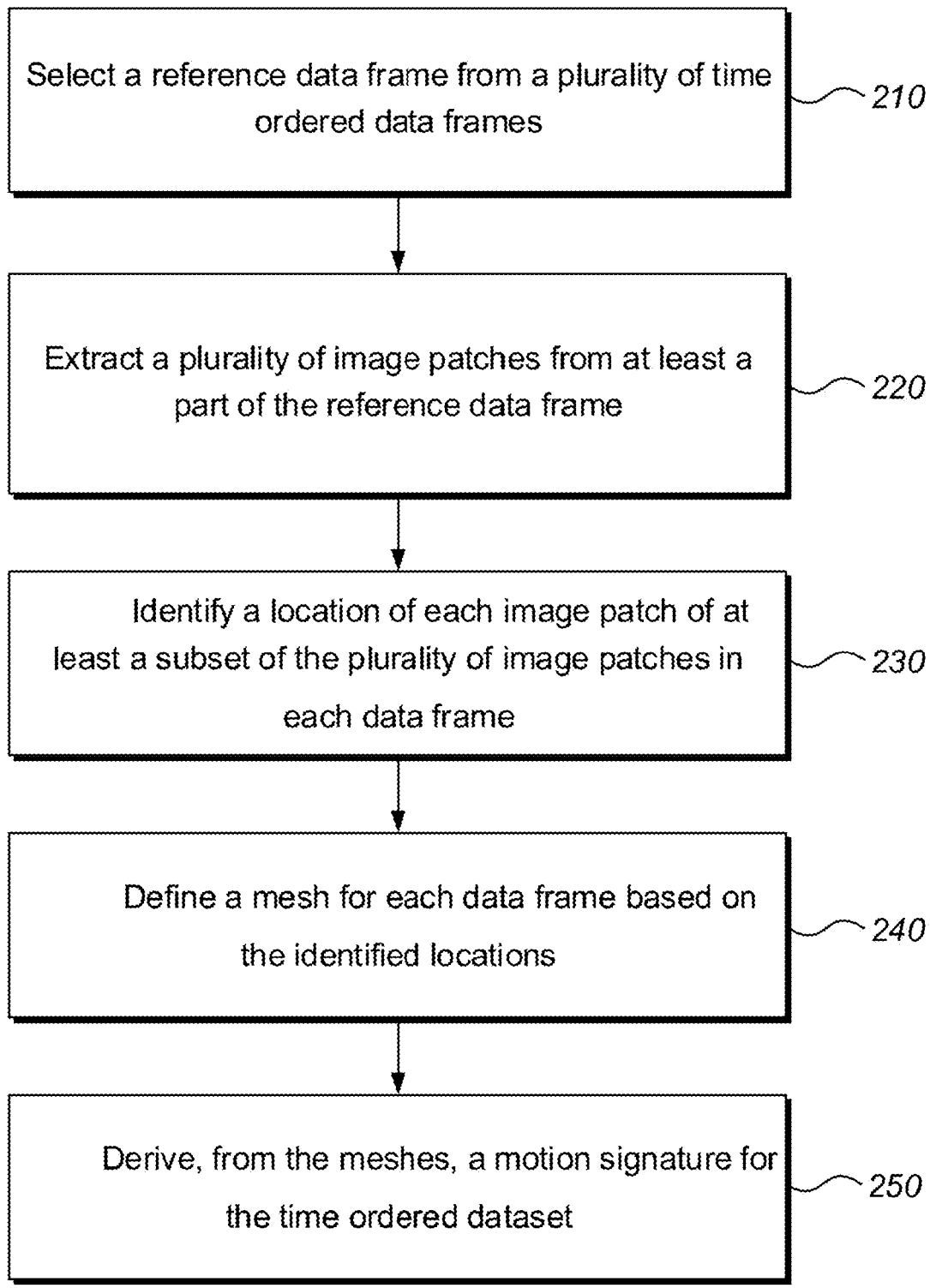
FIG. 2 shows a flowchart of a method for characterising the motion of one or more objects in a time ordered dataset.

FIG. 2 is a flowchart of a method for characterising collective motion of one or more objects in a time ordered image dataset. The time ordered image dataset comprises a plurality of time ordered data frames—for example, the time ordered image dataset may comprise a video and the plurality of time ordered data frames may comprise a plurality of video frames making up the video.

At step 210, the method comprises selecting a reference data frame from the plurality of time ordered data frames. For example, the plurality of time ordered data frames may comprise a plurality of time ordered images, such as in a video or a plurality of time-lapsed images, and the selected reference data frame may comprise a selected reference image, such as the first frame of the video or plurality of time-lapsed images.

At step 220, the method comprises extracting a plurality of image patches from at least a part of the reference data frame. The image patches may comprise, for example, supervoxels in three-dimensional data, or may comprise superpixels in two-dimensional data. The image patches may be extracted/assigned by any suitable method, for example, by segmentation, or by dividing the data frame into equally sized units of data. For example, if the time ordered image dataset comprises a video, then extracting a plurality of image patches from a reference video frame may comprise dividing the reference frame into equally sized superpixels.

In embodiments for which the plurality of time ordered data frames comprises a plurality of time ordered images, each image patch may comprise a superpixel. A superpixel i denoted $S_i$ may be defined as a geometric region with a centre (x,y) position (centroid), $c_i(t)=[x_i, y_i, t]$ at time t and may have an associated spatial area w which can be specified using a distance function relative to its centroid e.g. for time t=0, the superpixel area associated with $S_i$ are those pixels with (x,y) closest to the centroid of $S_i$. For the purposes of this example, that is $$\omega_i^0 := \{(x,y) | d_i(x,y) < d_j(x,y) \text{ for } j \neq i\}$$

where $d_i$ is a distance function. For regular superpixels this is the Manhattan distance where |•| is the absolute value.

$$d_i(x,y) := |x-x_i| + |y-y_i|$$

This area is preserved for t>0 when computing the average displacement to update superpixel positions for motion extraction. The average superpixel width ($w_s$) may be defined as $w_s = \sqrt{\mathbb{E}[\omega^0]}$ (wherein $\mathbb{E}[\bullet]$ denotes the average).

The skilled person would appreciate that an image patch, such as the superpixel $S_i$, may be considered to have an associated location (x,y) which in the present example is a centre position of the superpixel. However, the skilled person would also appreciate that the location of the image patch (x,y) may be defined in any other suitable way.

For analysis, it is sometimes easier to consider for t≥0 the disk area specified by a constant distance cut-off, $d_c$:

$$\omega_i^0 := \{(x,y) | d_i(x,y) < d_c\}$$

In the discussion, herein, for a given plurality of time ordered images, the set of all superpixels is denoted as S.

For a plurality of T time ordered images, the movement of superpixel $S_i$ may be described by a total of T positions which collectively describes the superpixel trajectory, $T_i$ $$T_i := \{(x_0^i, y_0^i), (x_1^i, y_1^i), (x_2^i, y_2^i), \ldots, (x_t^i, y_t^i) | t = 1, \ldots, T\}$$

The trajectory derived from propagating a superpixel forward from frames t=0 to t=T or backwards from frames t=T to t=0 is sometimes differentiated herein using a superscript, $T_i^F$ or $T_i^B$ respectively. If a superscript is not denoted, the forward trajectories may be assumed. For the position of a superpixel at time t one may denote $S_i(x_t, y_t)$ for forward tracks or $S_i(x_{-t}, y_{-t})$ for backward tracks.

Returning to FIG. 2, at step 230, the method comprises identifying a location of each image patch of at least a subset of the plurality of image patches in each data frame. The method may comprises identifying the location of every image patch in every data frame, or may comprise identifying a location of only a subset of the plurality of image patches in each data frame. For example, if the time ordered image dataset comprises a video of a number of objects, then one or more of those objects may travel in or out of the field of view of the camera by which the video was recorded as the video progresses. Accordingly, one may disregard superpixels/image patches that are associated with such objects. One may identify the locations of the image patches in any suitable way. For example, one may identify the location of an image patch by the location of the centre of the image patch. Image patches may be tracked from data frame to date frame by using optical flow methods or segmentation methods or any other suitable method.

At step 240, the method comprises defining, based on the identified locations of the image patches in the plurality of time ordered image patches, a mesh for each data frame, wherein vertices of each mesh correspond to respective identified locations of image patches in the corresponding data frame. A mesh may comprise a weighted graph in which the image patch locations are considered as vertices of the weighted graph, the vertices having an associated vertex weight (which may be defined in any of a number of ways, depending on the application, as will become more evident from the discussion below). Associations and connections between vertices/image patches are characterised by "edges" of the graph, the edges each also having an associated "edge weight" (which may be defined in any of several ways, depending on the applications, as will become evident from the discussion below). The mesh/weighted graph structure of a data frame captures information concerning the image patches and the associations (or lack thereof) between them. By analysing the mesh/weighted graph for each data frame of the plurality of time ordered data frames, one can determine properties of the collective motion of the one or more objects in the time ordered dataset.

A "mesh" as used herein may be thought of as a weighted graph $\mathcal{G} = (V, E, \omega_v, \omega_e)$ comprising a set V of vertices, nodes or points together with a set E of edges, arcs or lines where $\omega_v$, $\omega_e$ are weight functions that map a vertex v and an edge e to the set of real numbers. For a collection of points (vertices), there exist numerous ways to join those points (by edges) to form a graph or mesh. Depending on how the points are joined, different aspects of the movement of objects can be analysed. More generally, the mesh concept allows one to assess the spatial relationships between points.

Although in the present discussion the image patches comprise superpixels, the skilled person would appreciate that the concepts described here are applicable to other time ordered image datasets also, for example data frames for which the image patches comprise supervoxels.

In order to form a mesh, $\mathcal{G}$ from superpixel positions at time t, one can define the (ε−) neighbourhood of superpixel $S_i$ as $$\mathcal{N}_\varepsilon^i = \{S_j \varepsilon S | d(S_i(x_t, y_t), S_j(x_t, y_t)) \leq \varepsilon\}$$

in which ε is a threshold function and d(•) is a distance function comparing the closeness of two points. A superpixel $S_j$ in the neighbourhood of $S_i$ is connected to $S_i$ by an edge, $E_{ij}$ with an edge 'weight', $\omega_{e_{ij}}$ and $\omega_{v_i}$ is a feature vector that describes attributes of the vertex e.g. image intensity at the point $S_i$ ($x_t, y_t$).

A dynamic superpixel mesh may accordingly be described as the set of all meshes defined by the superpixel neighbourhood from time t=0 to t=T.

$$G := \{\mathcal{G}_0, \mathcal{G}_1, \mathcal{G}_2, \ldots, \mathcal{G}_t | t = 0, 1, \ldots, T\}$$

Several possible mesh structures will now be described. Advantageously, each mesh structure can be used to analyse a different feature of the underlying dynamics of the one or more objects being studied.

The following mesh structures are described in relation to superpixels but the skilled person will appreciate that the ideas to which these mesh structures relate may be extended to higher dimensional image data or other structured data.

MOSES Mesh

The MOSES mesh uses a constant distance cut-off threshold, with a Euclidean distance. Its vertex weighting function is the change in the average neighbourhood mesh strain with respect to the initial configuration in analogy with mechanics. The superpixel neighbourhood is fixed to be the same as at t=0 for all time.

$$d(S_i^t, S_j^t) = \sqrt{(x_t^i - x_t^j)^2 + (y_t^i - y_t^j)^2},$$

$$\varepsilon = c\omega_s, c \in \mathbb{R}$$

$$\mathcal{N}_\varepsilon^i(t=t) = \mathcal{N}_\varepsilon^i(t=0),$$

$$\omega_{v_i} = \mathbb{E}[|d(S_i^t, S_j^t) - d(S_i^0, S_j^0)|], \forall j \in \mathcal{N}_\varepsilon^i$$

Intuitively this can be seen as a local neighbourhood extension of root mean square distance and is related to the Cauchy-Green deformation tensor, a measure of the local material strain rate in continuum mechanics.

The MOSES mesh structure, when compared for each frame of a video, shows how superpixels that were in close proximity in a reference image (such as the first image of the video) can propagate across the frames of the video. Computing the strain or stretch of each point of the MOSES mesh is similar to measuring the relative distortion and change of the mesh at time t=t with the mesh at time t=0.

Radial Counts Density Mesh

The radial counts density mesh uses a constant distance cut-off threshold with a Euclidean distance. Its vertex weighting function is the count of the number of neighbours in the ε-neighbourhood. The superpixel neighbourhood is computed using the superpixel positions at time t.

$$d(S_i^t, S_j^t) = \sqrt{(x_t^i - x_t^j)^2 + (y_t^i - y_t^j)^2},$$

$$\varepsilon = cw_s, C \in \mathbb{R}$$

$$\omega_{v_i} = |\mathcal{N}_\varepsilon^i|, \forall j \in \mathcal{N}_\varepsilon^i$$

The Radial Counts Density mesh advantageously captures the spatial heterogeneity of motion by counting the number of neighbours for each superpixel to reveal local clustering patterns.

The number of surrounding members will increase in spatial regions where there is a concentration of movement.

Radial Neighbours Mesh

The radial neighbours mesh uses a constant distance cut-off threshold with a Euclidean distance. Its vertex weighting function is the change in the average neighbourhood mesh strain with respect to the initial configuration where the superpixel neighbourhood is recomputed using the superpixel positions at time t.

$$d(S_i^t, S_j^t) = \sqrt{(x_t^i - x_t^j)^2 + (y_t^i - y_t^j)^2},$$

$$\varepsilon = cw_s, C \in \mathbb{R}$$

$$\omega_{v_i} = \mathbb{E}\left[|d(S_i^t, S_j^t) - d(S_i^0, S_j^0)|\right], \forall j \in \mathcal{N}_\varepsilon^i$$

kNN Mesh

The kNN (k-nearest neighbours) mesh is a topological distance which defines the neighbourhood of a superpixel as the k nearest superpixels. The distance measure used is a Euclidean distance. The vertex weighting function of this mesh is the change in the average neighbourhood mesh strain with respect to the initial configuration where the superpixel neighbourhood is computed using the superpixel positions at time t.

$$d(S_i^t, S_j^t) = \sqrt{(x_t^i - x_t^j)^2 + (y_t^i - y_t^j)^2},$$

$$\varepsilon = d(S_k^t, S_i^t)$$

$$S_j \in S | d(S_1^t, S_i^t) < d(S_2^t, S_i^t) < \ldots < d(S_k^t, S_i^t),$$

$$\omega_{v_i} = \mathbb{E}\left[d(S_i^t, S_j^t) - d(S_i^0, S_j^0)\right], \forall j \in \mathcal{N}_\varepsilon^i$$

The kNN mesh is useful to propagate local information and mine patterns in data where topology is more important than distance.

For all meshes, tuning the cut-off threshold is equivalent to tuning the particular length-scale of the spatial interaction one chooses to analyse.

Returning to the description of FIG. 2, at step 250, the method comprises deriving, from the meshes, a motion signature for the time ordered image dataset, the motion signature characteristic of the collective motion of the one or more objects in the plurality of time ordered data frames. The motion signature may be derived in any of a number of ways, as will be explained in more detail below and throughout this specification.

For example, deriving, from the meshes, a motion signature for the time ordered image dataset may comprise calculating, for each mesh, the average displacement of the vertices of the mesh from the corresponding vertices of the reference mesh. The vertex weight for each vertex of the respective mesh/weighted graph may be defined for example by the average change, with respect to a reference weighted graph of the reference data frame, in distance between the vertex and each other vertex in its neighbourhood.

It can be difficult to directly use dynamic meshes to compare meshes across videos as the dynamic mesh in general requires a $(T \times N \times N_{features})$ matrix to describe the vertex features and a $(T \times N \times N)$ matrix to describe the dynamic edge connections for a video with T frames, N superpixels and each vertex is described by $N_{features}$.

However, as an example, for the MOSES mesh with $N_{features}=1$, three motion signatures are described here.

As a first example, deriving, from the meshes, a motion signature for the time ordered image dataset may comprise averaging, for each mesh, the vertex weights of all of the vertices of the mesh. This may be known as the MOSES "mesh strain curve" or the "forward motion signature" of a plurality of time ordered images:

$$\text{Signature}_{MOSES}^F(t) = \left\{ \frac{1}{|S|} \sum_i \omega_{v_i}(t) \,\bigg|\, t = 0, 1, \ldots, T \right\}$$

where |S| is the number of superpixels or the cardinality of the superpixel set.

As a second example, a "backward motion signature" may be defined for a plurality of time ordered images:

$$\text{Signature}_{MOSES}^B(t) = \left\{ \frac{1}{|S|} \sum_i \omega_{v_i}(t) \,\bigg|\, t = T, T-1, \ldots, 0 \right\}$$

As a third example, one may define a "total motion signature" for a plurality of time ordered images:

$$\text{Signature}_{MOSES}^T(t) = \frac{1}{2}\left(\text{Signature}_{MOSES}^F(t) + \text{Signature}_{MOSES}^B(t)\right)$$

As will become apparent from the discussions below, other motion signatures may be derived from a mesh. For example, one may derive a motion signature for a time ordered dataset using the concept of a motion saliency map.

A motion saliency map, Sal(x,y) may be defined as a temporally averaged image across a time interval $[t_0, t_0+\delta t]$ where for each time frame one can form a spatial image the same size as the video frame and map the vertex weights $\omega_{v_i}$ of each superpixel to the corresponding superpixel position in the image at time t, $(x_t^i, y_t^i, t)$. If two superpixels are in the same spatial location, their corresponding vertex weight is added, upvoting this spatial area. A motion saliency map may therefore be defined as:

$$Sal(x, y) = f(x, y) * \frac{1}{\delta t}\left\{ \sum_{t=t_0}^{t_0+\delta t} \mathbb{P}\left[\omega_{v_i}(x_t^i, y_t^i) \,|\, i \in S\right] \right\}$$

where f(x,y) is a 2d smoothing kernel taken typically to be a 2d Gaussian kernel, * is a convolution operation and $\mathbb{P}[\bullet]$ is an estimated spatial probability distribution of the weights here using a 2d histogram where the image is equipartitioned into K regular square bins. For bin k with width w,

[$x_k$<x<$x_k$+w, $y_k$<y<$y_k$+w] one assigns the total sum of $\omega_{v_i}^t$ of all superpixels whose centroids lie in it:

$$P_k = \sum_i \omega_{v_i}^t, \{\forall\, i \in S \,|\, x_k < x_i^t < x_k + w, y_k < y_i^t < y_k + w\}$$

The motion saliency map for a video may be computed over the entire length of the video or over a subset of the frames.

Motion saliency maps, also known as spatial heat maps, may be used to derive motion signatures such as the boundary formation index (which is relevant in the context of analysis of cell populations in a live cell sheet as will be described further below). This is shown in FIG. 3. First produce the spatial heat map for computing the boundary formation index. To do this for each frame construct the radius count density mesh using the spatial positions of superpixels in that frame and populate a blank image at the pixel position (x,y) of each superpixel with the count of the number of surrounding neighbours. This yields an 'image' of size n_frames×n_rows×n_cols, where n_rows, n_cols are the image dimensions. Compute the temporal average to yield an image of size n_rows×n_cols. The values of the matrix are then binned spatially using equal sized histogram bins (as defined above). Note how by virtue of the summation operation, only superpixels that remain in the same location are given high values, superpixels that are constantly in motion covering a large spatial area will simply be averaged out. In addition this formulation naturally integrates out any dependence on the frequency and length of imaging acquisition. By construction, this spatial map is general for studying any phenomenon where spatial localisation plays a role. To turn the image into a quantitative measure or motion signature that can be used for global quantitative comparison across videos, segment the image into high and low intensity using otsu thresholding and compute the normalised signal-to-noise ratio defined by $$\frac{(\text{mean(high)} - \text{mean(low)})}{\text{mean(high)}}.$$

The mean is used as the spatial map is computed from a sparse set of points given by the number of superpixels therefore individual pixel values such as the maximum may be noisy. The denominator is set to be the high intensity region in order to give a number bounded between 0-1 for standardised comparison.

The example motion signatures described above are not exhaustive and further motion signatures will become apparent to the person skilled in the art from reading this specification.

Figure 4:
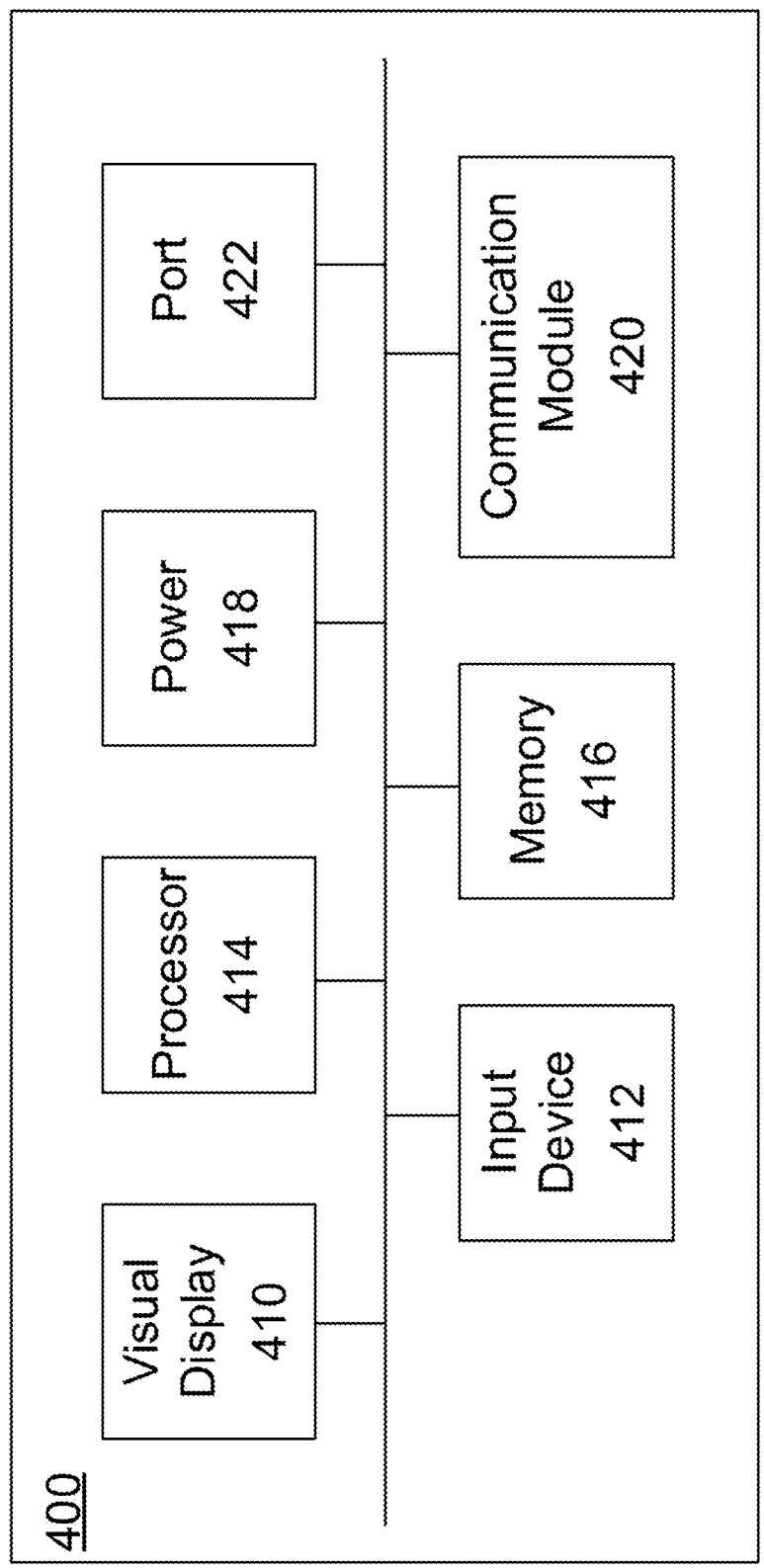
FIG. 4 shows a block diagram of a computing apparatus.

FIG. 4 is a block diagram of a computing system 400 in accordance with an embodiment of the invention. The computing system 400 is suitable for characterising collective motion of one or more objects in a time ordered image dataset, for example by using the method described above in relation to FIG. 2. The computing system or apparatus 400 may comprise a single computer, a server, or some other computing device. Other architectures to that shown in FIG. 4 may be used as will be appreciated by the skilled person.

Referring to the figure, the computing system 400 includes a number of user interfaces including visualising means such as a visual display 410 and a virtual or dedicated user input device 412. The computing system 400 includes a processor 414, a memory 416 and a power system 418. The computing system 400 comprises a communications module 420 for sending and receiving communications between processor 414 and remote systems. For example, communications module 420 may be used to send and receive communications via a network such as the Internet. In this way, the computing system may, for example, receive the time ordered dataset, and may communicate results to third parties. The computing device 400 comprises a port 422 for receiving, for example, a non-transitory computer-readable medium containing instruction to be processed by the processor 414.

The processor 414 is configured to receive data, access the memory 416, and to act upon instructions received either from said memory 416, from communications module 420 or from user input device 412. In particular, the processor 414 is configured to receive data from the user input device 412, the communications module 420 or the port 422. The processor 414 is configured to select a data frame from the time ordered dataset to be used as a reference data frame. The processor 414 is further configured to extract a plurality of image patches from at least a part of the reference data frame. The processor 414 is further configured to identify a location of each image patch of at least a subset of the plurality of image patches in each data frame. The processor 414 is further configured to define, based on the identified locations, a mesh for each data frame, wherein vertices of each mesh correspond to respective identified locations of image patches in the corresponding data frame. The processor 414 is further configured to derive, from the meshes, a motion signature for the time ordered image dataset, the motion signature characteristic of the collective motion of the one or more objects in the plurality of time ordered data frames.

The processor 414 is configured to cause information to be sent via the communications module to third parties.

Figure 5:
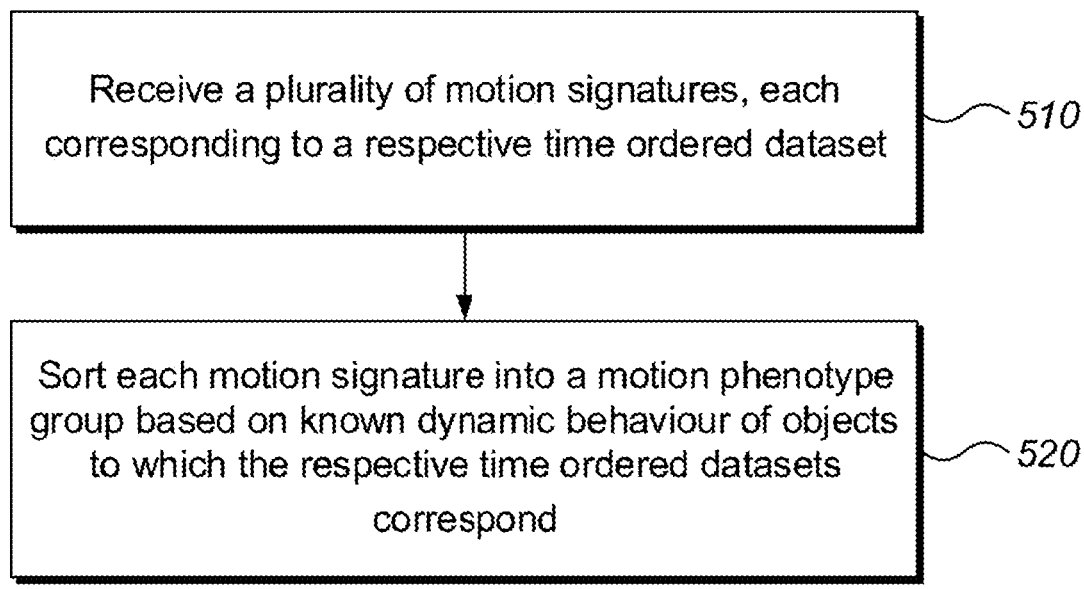
FIG. 5 shows a flowchart of a method for categorising time ordered image datasets of one or more objects for which a dynamic behaviour is known.
Figure 6:
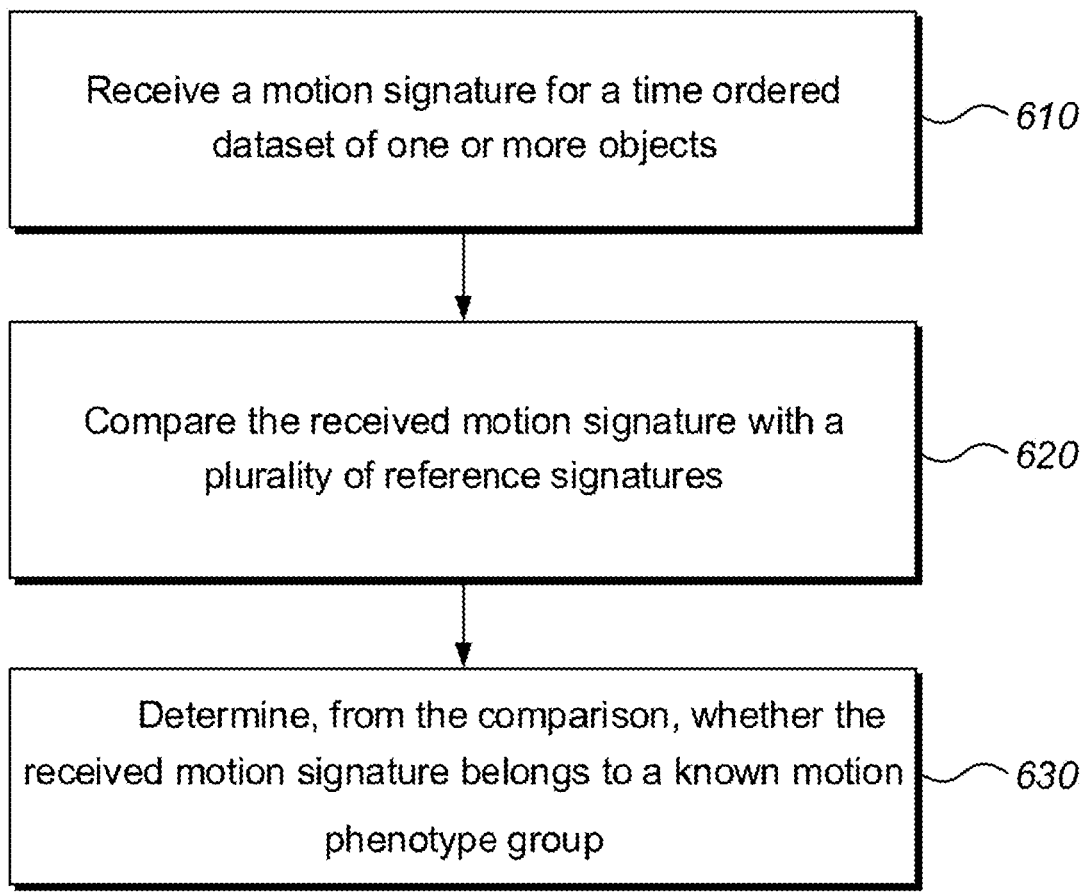
FIG. 6 shows a flowchart of a method for classifying a dynamic behaviour of one or more objects in a time ordered image dataset.

The discussion above in relation to the method of FIG. 2 and the apparatus of FIG. 4 has concerned the derivation of a motion signature for a time ordered dataset, the motion signature characteristic of the motion of the one or more objects in the time ordered dataset. FIGS. 5 and 6 relate to the use of such motion signatures in, for example, categorising or classifying other time ordered datasets based on the motion of the objects therein.

FIG. 5 is a flowchart of a method for categorising pluralities of time ordered image datasets of one or more objects for which a dynamic behaviour is known.

At step 510, the method comprises receiving a plurality of motion signatures. Each motion signature of the plurality of motion signatures corresponds to a respective time ordered dataset of one or more objects and is characteristic of a dynamic behaviour of the one or more objects.

At step 520, the method comprises sorting each motion signature into a motion phenotype group based on the known dynamic behaviour of the one or more objects to which the respective time ordered dataset corresponds.

The method of FIG. 5 may be performed by any suitable computing apparatus, for example, the computing system 400 of FIG. 4. For example, processor 414 may be configured to receive the plurality of motion signatures from the user input device 412, communications module 420 or port 422 and may store the plurality of motion signatures in memory 416. The processor may be further configured to sort each of motion signatures into a motion phenotype group based on the known dynamic behaviour of the one or more objects to which the respective time ordered dataset corresponds. Details of the one or more motion phenotype groups and the memberships thereof may be stored in memory 416.

FIG. 6 is a flowchart of a method for classifying a dynamic behaviour of one or more objects in a time ordered image dataset.

At step 610, the method comprises receiving a motion signature corresponding to the time ordered image dataset of the one or more objects. The motion signature is characteristic of the dynamic behaviour of the one or more objects in the time ordered image dataset.

At step 620, the method comprises comparing the received motion signature with a plurality of reference signatures, wherein each reference signature of the plurality of reference signatures corresponds to a respective time ordered image dataset of a respective one or more objects for which a dynamic behaviour is known. Each reference signature has been sorted into a motion phenotype group according to the known dynamic behaviour, for example via the method of FIG. 5.

At step 630, the method comprises determining, from the comparison, whether the received motion signature belongs to a known motion phenotype group.

The method of FIG. 6 may be performed by any suitable computing apparatus, for example, the computing system 400 of FIG. 4. For example, processor 414 may be configured to receive the motion signature from the user input device 412, communications module 420 or port 422 and may store the received motion signature in memory 416. The processor may be further configured to compare the received motion signature with the plurality of reference signatures, which may be stored in memory 416. The processor may be further configured to determine from the comparison whether the received motion signature belongs to a known motion phenotype group.

The methods described above will now be explained in further detail in relation to the analysis of cell population interactions and, in particular to interactions between populations of epithelial cells.

An example of a suitable problem that would benefit from a high-throughput computational analysis is the formation of stable boundaries between homo- and heterotypic cell populations. When two cell types meet in-vivo, they often form a sharp, stable interface termed a 'boundary' with limited intermingling. In adult humans, sharp boundaries separate different types of epithelia; for example, between the squamous and columnar epithelia in the esophagus, cervix and anus. Disruption of these boundaries can lead to disease. Human papilloma virus (HPV) infection disrupts the squamous and columnar junction (SCJ) in anal and cervical cancers and a subtle difference in junction structure may confer a difference in disease risk for these cancers. Disruption of the squamo-columnar epithelial boundary in Barrett's Esophagus (BE) confers a 30-50 fold increased risk for developing esophageal adenocarcinoma (EAC). Understanding how the tissue dynamics is correlated with the pathological phenotype and how it can be affected by intrinsic and extrinsic factors is therefore a key issue. Thus, there is a strong interest in live cell imaging for high throughput screening and analysis to identify targets and drugs that can cause or prevent abnormal cellular motion.

Such applications require the extraction of quantitative biologically relevant information from complex time-lapse imaging data in a manner that allows quantification of phenotypic variation under different experimental conditions. However many known tools are currently limited. Existing experimental approaches mainly emphasise individual cell/cell interactions and single cell migration. Studies of cell population interactions and migration have been limited. Most assays use a single cell type (e.g. in a scratch wound healing assay), the reproducibility of which may be limited by the potential effects of using cell transfection, cell seeding and growth rates of individual cells and are thus not suited to systematically analyse interactions between populations of different cell types particularly for high content screens.

To address all the above informatics challenges the inventors have developed Motion Sensing Superpixels (MOSES). The potential of MOSES has been tested using a multi-well plate based in-vitro system at medium-throughput to study the cell population dynamics and interactions between different epithelium at the esophageal squamous columnar junction (SCJ). The videos acquired were deliberately heterogeneous; acquired over separate days at varying imaging resolutions, different time lengths, assorted dye concentrations and various plating geometries to test the ability of MOSES to handle challenging datasets. The results, as will be discussed below, demonstrate that MOSES robustly captures the relevant aspects of epithelial interactions and fulfils requirements for unbiased high content, comparative biological video analysis and phenotypic discovery.

Figure 7:
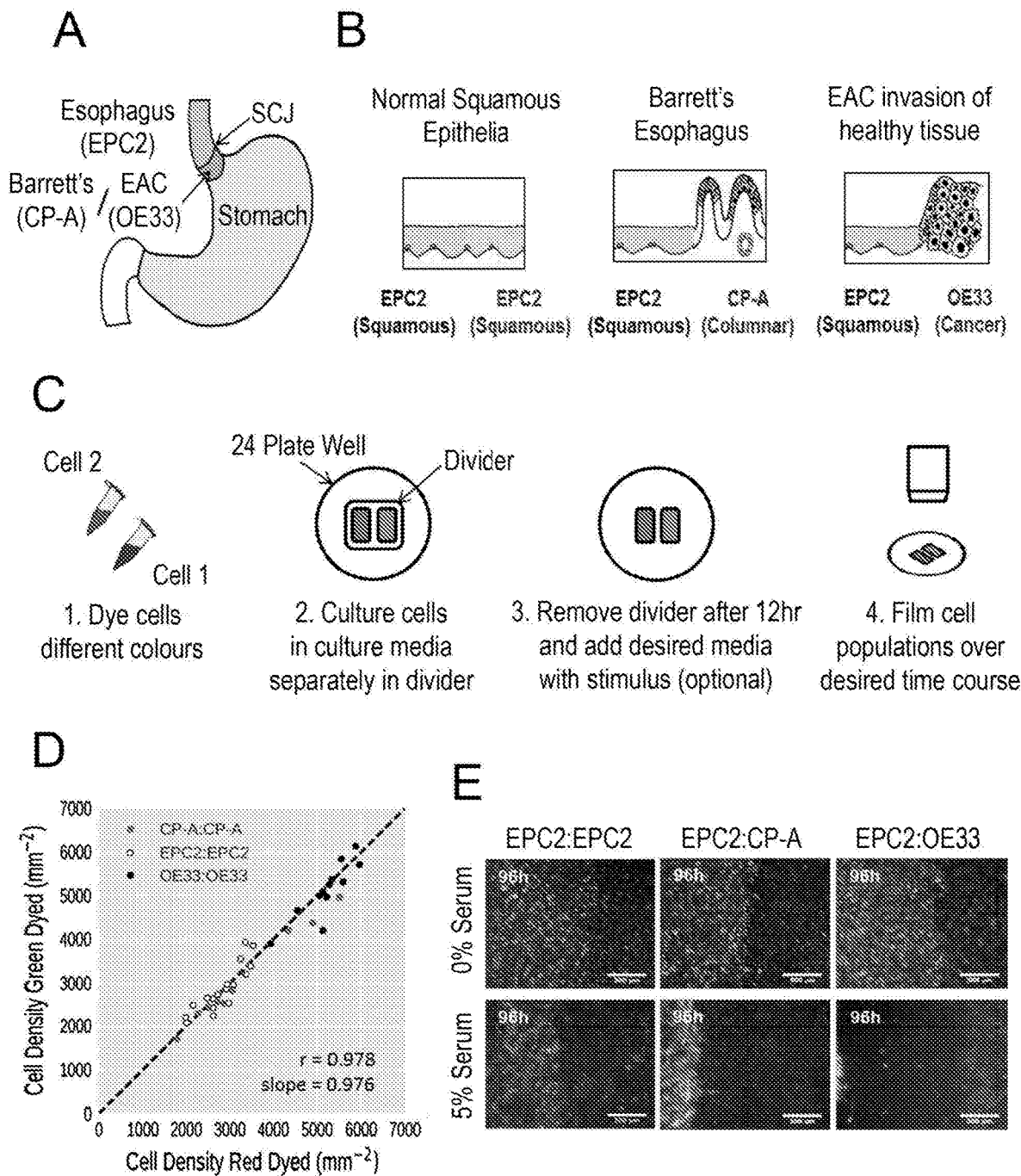
FIG. 7A shows the squamous columnar junction (SCJ) which divides the stratified squamous epithelia of the esophagus and the columnar epithelia of the stomach.
FIG. 7B shows the three main epithelial interfaces that occur in Barrett's Esophagus (BE) to esophageal adenocarcinoma (EAC) progression.
FIG. 7C shows an overview of an experimental procedure described herein.
FIG. 7D shows the cell density of red vs green dyed cells in the same culture.
FIG. 7E shows a snapshot at 96 hours of three combinations of epithelial cell types.

To develop a motion analysis framework an experimental model was established to assess boundary formation between squamous and columnar epithelia at the oesophageal squamous-columnar junction (SCJ) (see FIG. 7A). Three different epithelial cell lines were used; EPC2 (an immortalised squamous epithelial cell line from the normal esophagus), CP-A (an immortalised Barrett's esophagus (BE) cell line with columnar epithelial properties) and OE33 (derived from EAC) in combination to model the interfaces that occur in the esophagus in the context of normal oesophagus as a control, Barrett's esophagus and cancer: EPC2:EPC2 (squamous:squamous), EPC2:CP-A (squamous:columnar) and EPC2:OE33 (squamous: cancer) respectively (see FIG. 7B). FIG. 7C illustrates the experimental assay. Two epithelial cell populations are co-cultured in the same well of a 24-well plate, separated by a divider with width 500 μm. The divider is then removed after 12 hours and the cells are allowed to migrate towards each other. Each cell population is labelled with a fluorescent dye, which has the advantage over transfectants or genetic reporters of not perturbing migration and proliferation and can be used to label primary cells.

The effects of the dye were first tested in two populations of EPC2, filmed over 96 and 144 hrs. The green and red fluorescent labelled EPC2 cells proliferated similarly, exhibiting the same cell density over the time course (slope=0.976, Pearson correlation coefficient 0.978; automatically counted from DAPI staining) (see FIG. 7D) and migrated similarly (assessed by the mean squared displacement). Thus, the red/green labelling dye has a minimal impact on cell motion behaviour. The effects of the red/green dye were similarly checked in CP-A and OE33 (see FIG. 7D).

Next, different combinations of the three epithelial cell lines were tested (see FIG. 7E). When cultured in serum (5% FBS), both populations in all combinations moved as epithelial sheets. In the squamous EPC2:EPC2 combination, cells met and coalesced into a monolayer. In the squamous-columnar EPC2:CP-A combination stable boundary formation was observed after 72 hrs, following a short period of CP-A pushing EPC2 (see FIG. 7E). In the squamous:cancer EPC2:OE33 combination, the cancer cell line OE33 pushed EPC2 out of the field of view.

Evidence from systems including *Drosophila* embryonic parasegment and anteroposterior and dorsoventral wing disc boundaries suggest the importance of physical properties of cell/cell interactions for boundary formation and that collective migration is required for stable boundaries between epithelia populations. To test the importance of physical contact in boundary formation, the same cell combinations were cultured in serum free medium to reduce cell-cell contacts. Under these conditions the loss of collective sheet migration was observed with no detectable boundary formation, and all cell combinations appeared to exhibit similar motion dynamics. This indicates that cell-cell contacts are required for boundary formation. In subsequent experiments serum free conditions were used as a negative control for boundary formation.

To address the computational challenges of analysing collective motion and cell interactions in a robust and sensitive manner MOSES was developed. For the purposes of the experiment described here, 1000 superpixels were used to cover an image size of 1344×1024 (with this setting an average superpixel is 37 pixels×37 pixels covers≈14000 µm² (2× lens) or ≈57000 µm² (4× lens)) to track the sheet dynamics. The video channel for each different coloured cell population (i.e. red and green in the described experimental system) is independently tracked in this manner.

The accuracy of the superpixel motion extraction was tested experimentally by adding a sparse population of blue cells to the in-vitro setup described above (the blue cells being of the same cell type as the population they were added to). All three combinations of cell types (EPC2:EPC2, EPC2:CP-A and EPC2:OE33) were tested and the red/green dye and the spiked-in population were also switched, generating 23 videos (each 144 hr). To assess the performance of MOSES in tracking at particle level resolution (i.e. tracking the spiked-in cells), tracks generated by TrackMate, a published single particle tracker implemented in Fiji, were used as a benchmark. When the field of view was divided into 10000 superpixels in MOSES, the tracks were highly similar to TrackMate. To assess if the motion of single cells could be inferred from sheet motion, 1000 superpixels were used to track the motion of the sheet and the nearest superpixel tracks to each spiked-in cell were averaged to estimate the single cell trajectories and compared to Track-Mate. Although the precise individual cell trajectory was lost, the overall motion pattern of the spiked in cells could be inferred. Therefore, in confluent epithelial sheets, individual cells behave similarly to their neighbours so global motion patterns can be used as a proxy to study single cell behaviour.

To test the ability of MOSES to generate quantitative features or measurements that can be used to assess a specific biological feature, the example of stable boundary formation was used to define three indices: i) boundary formation index; ii) motion stability index; and iii) maximum velocity cross-correlation. Boundary formation and motion stability are mesh derived statistics/motion signatures. Maximum velocity cross-correlation is derived from the individual superpixel tracks.

The boundary formation index is a global measure of the likelihood of stable boundary formation, by exploiting the notion that a boundary can be viewed as a spatially constrained phenomenon. By historically aggregating the number of neighbouring superpixels within a specified radius for each superpixel, one can generate a motion saliency heatmap from which one can quantify the global likelihood of boundary formation in a simple normalised signal-to-noise ratio index from 0-1, (see FIG. 3); the higher the score the greater the likelihood of boundary formation. The boundary formation index is described in further detail above in relation to FIG. 3.

The motion stability index is a local measure that assesses the additional stability of the interface between the two cell populations not captured by the boundary formation index, where individual cells in the sheet may still be moving stochastically without affecting the equilibrium spatial position and shape of the boundary. It is computed by subtracting from 1 the gradient of the normalised mesh strain curve, which measures the relative degree of motion of superpixels with respect to its neighbours within the tissue. The normalised mesh strain curve is a natural generalisation of the root mean squared displacement curve (RMSD) where RMSD $(t) = \sqrt{(|r_i(t) - r_i(t_0)|^2)}$, $r_1(t)$ is the position of superpixel i at time t and $\langle \cdot \rangle$ is the average over all time t and all superpixels. To compute the normalised mesh strain curve the following steps were taken. For each superpixel at time t the local neighbourhood $\mathcal{N}$, mesh strain $\varepsilon(t)$ was defined with n neighbours as the mean of the distances $x_j(t)$ from the equilibrium position $x_j(0)$ so that $$\varepsilon(t) = \frac{1}{n} \sum_{j \in \mathcal{N}} |x_j(t) - x_j(0)|$$

where $|\cdot|$ is the L1-norm. To permit comparison across different conditions the normalised strain curve (division by maximum strain) was used as a simple signature to describe the global video motion pattern. The normalised mesh strain curve is another example of a mesh-derived motion signature.

The higher the motion stability index (maximum value of 1), the more stable the boundary and the cells at the boundary. The motion stability index for a cell combination is computed from the averaged normal mesh strain curve of the individual cell populations.

The maximum velocity cross-correlation measures the degree that two epithelial sheets moves together as a single cohesive connected sheet by correlating each superpixel track in one population (colour) with every cell group of the other population (colour), factoring in time delays. It is an averaged normalised measure (0-1). For two initially diametrically migrating sheets, a significant increase in this measure before and after closure of the gap is indicative of increased interaction across the sheets. This may be due to increased cell-cell contact in the combined monolayer leading to increased coordinated motion across larger spatial scales. Mathematically, velocity cross-correlation measures the correlation between two signals taking time delay into account. As 'signals', the spatially location-independent, time-dependent velocity, V(t)=r(t+1)−r(t) is used. Velocity is a vector quantity with both x and y components. Letting • denote the scalar product, the normalised velocity cross correlation (VCC) with values bounded by [−1,1] between red superpixel $S_i^R$ and green superpixel $S_i^G$ at time t and time lag m is $$VCC_{ij}(m, t) = \frac{1}{T} \sum_{n=-T}^{n=T} \hat{V}_i(t+m) \cdot \hat{V}_j(t)$$

where $$\hat{V}_i = \frac{V_i - \overline{V}_i}{\sigma_i},$$

the bar denotes the average and $\sigma_i$ is the standard deviation of $V_i$.

These descriptors/measures are just examples of statistics and motion signatures that can be derived using MOSES.

Figure 8:
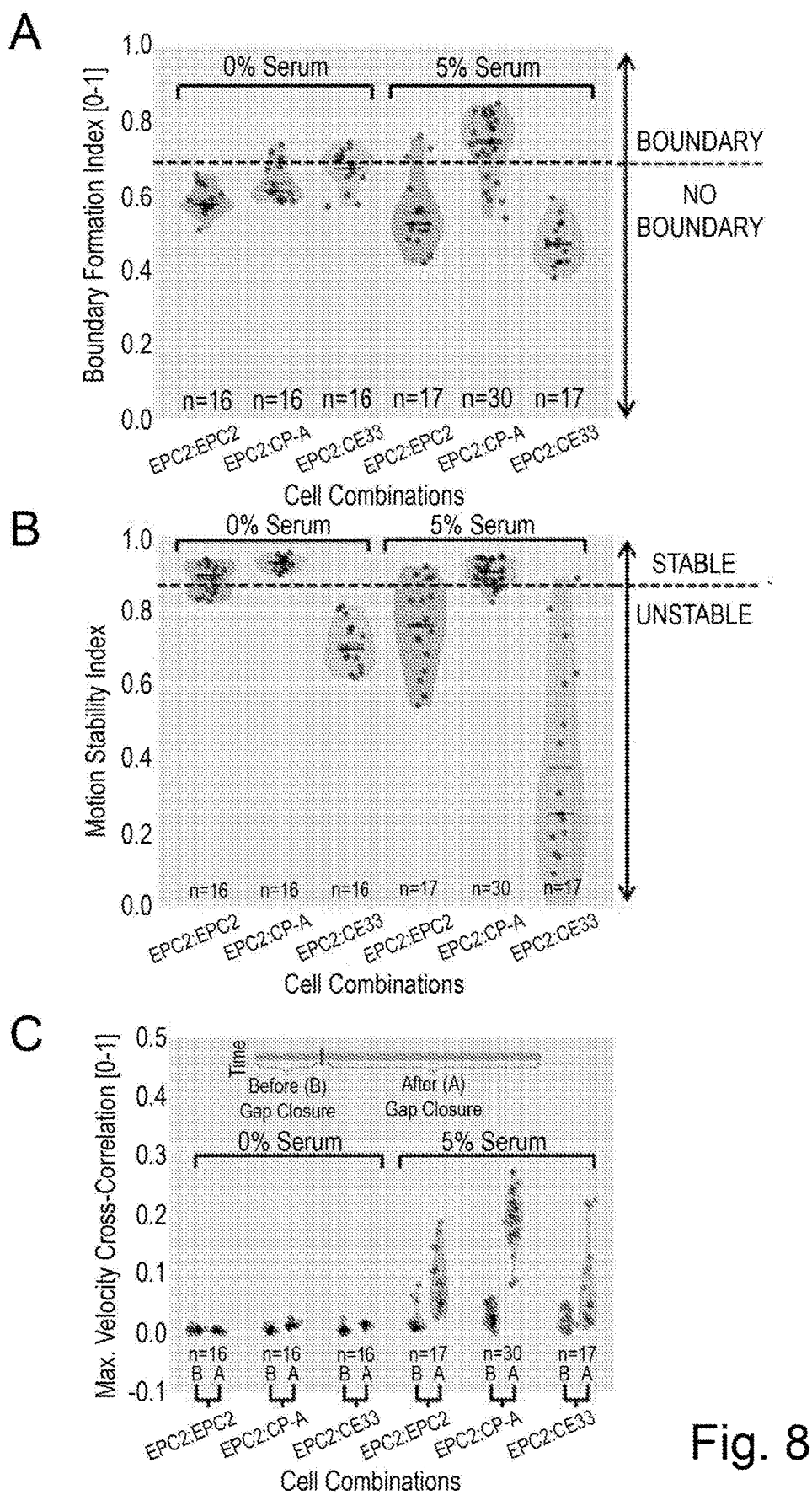

MOSES was used to compute these indices for different combinations of the three cell lines (EPC2, CP-A and OE33) in the experimental system. In total 125 videos (48 with 0% serum and 77 with 5% serum) were collected from 4 independent experiments and jointly analysed. Cells grown in 0% serum were used as negative control to set a cut-off for boundary formation (0.69) defined statistically as one standard deviation higher than the pooled mean of all three combinations (see FIG. 8A). Above this cut-off, cell combinations form a boundary. The boundary formation index was highest (0.74) for EPC2:CP-A grown in 5% serum (n=30/77) (FIG. 8A). Even in serum the index for EPC2: EPC2 and EPC2:OE33 was below the boundary formation cut-off.

Similarly cells grown in 0% serum were used to set the global motion stability threshold (0.87), one standard deviation higher than the pooled mean of EPC2:EPC2 and EPC2: CP-A. Cells at the interface of EPC2:OE33 was not stable and therefore not included in the pooled statistics. Below this cut-off, cell combinations form unstable interfaces. Here EPC2:CP-A also had the highest motion stability index with a median value of 0.90, compared to EPC2:EPC2 (0.76) and EPC2:OE33 (0.25) whose interface is unstable (see FIG. 8B). These results illustrate that the squamous-columnar combination EPC2:CP-A forms a stable boundary.

Sheet-sheet interactions were measured using the maximum velocity cross-correlation before and after gap closure for the three cell type combinations. In 0% serum there is no difference in velocity cross-correlation across all combinations before and after gap closure (See FIG. 8C). The two sheets do not move cohesively as a unit to be expected with minimal cell-cell contact. In serum due to cell-cell contact there is greater cohesion. The difference for EPC2:CP-A (median value of 0.03 before and 0.20 after) was ~3-6 times larger than for EPC2:EPC2 (0.01 to 0.08) and EPC2:OE33 (0.02 to 0.05), (c.f. left and right violins in FIG. 6C).

It will also now be demonstrated that the methods of characterising motion described herein, and the MOSES framework, can be used to measure subtle motion phenotype changes induced by external stimuli.

As evidence of the efficacy of the methods described herein and of the sensitivity of MOSES, a test was performed to assess whether MOSES could detect subtle changes in the EPC2:CP-A boundary caused by an external stimulus.

The main cause of BE is bile acid reflux. Bile acid activates epidermal growth factor receptor (EGFR), a receptor tyrosine kinase that is frequently mutated in EAC and sometimes overexpressed in BE. Accordingly, EGF was used instead, the ligand of EGFR, as a stimulus to activate the EGFR signalling pathway. Increasing amounts of EGF (0 ng/ml to 20 ng/ml) were added to the culture medium to assess incremental effects on cellular motion and boundary formation in the EPC2:CP-A combination. A total of 40 videos (each 144 hr) were collected from three independent experiments, in a 24-well plate medium throughput screen.

Figure 9:
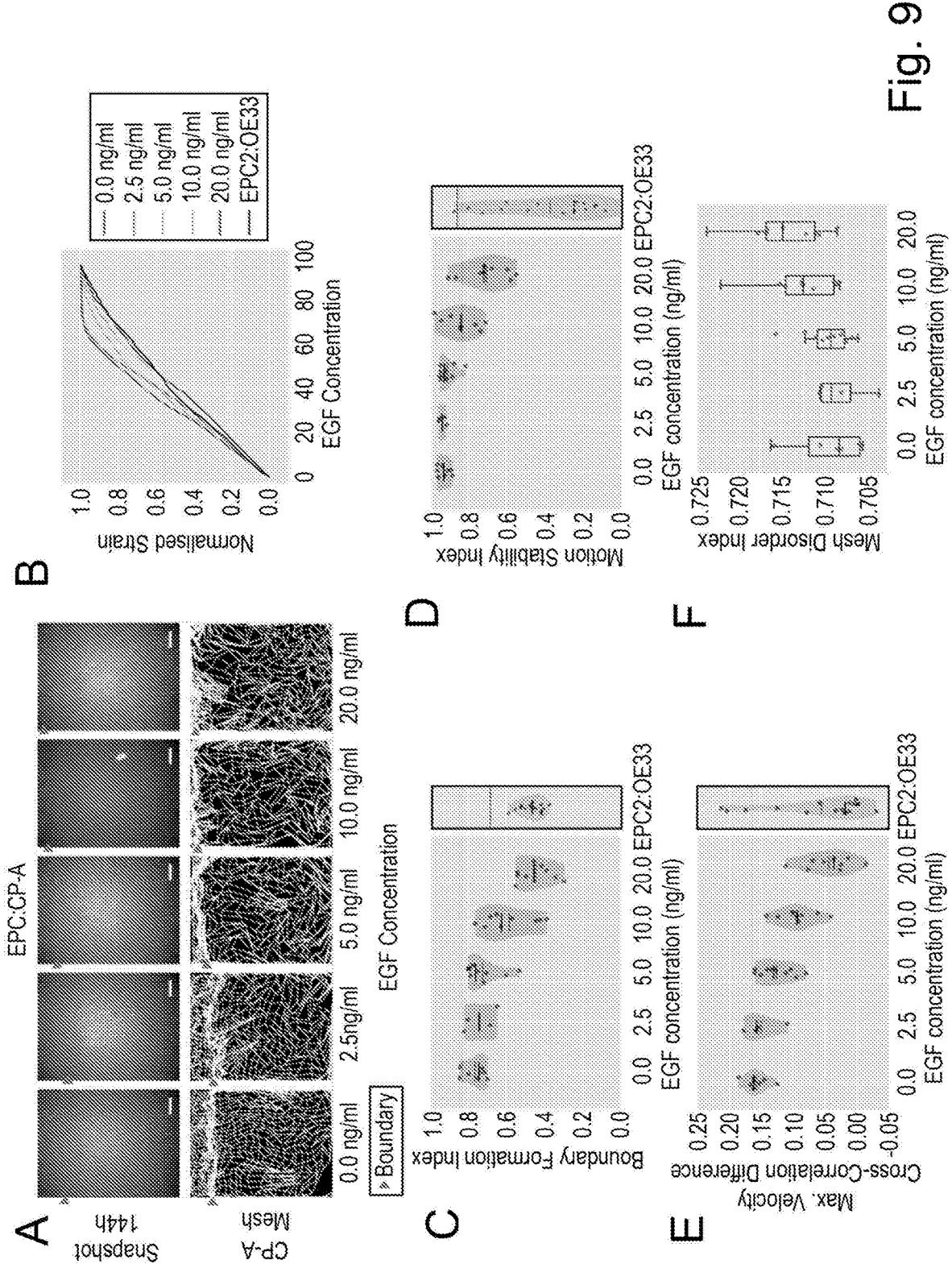
FIG. 9A shows that EGF titration at physiological levels disrupts boundary formation between two cell types in a cell sheet.
FIG. 9B shows the mean normalised strain curves for each concentration.
FIG. 9C shows a violin plot for the boundary formation index for each concentration of EGF.
FIG. 9D shows a violin plot for the motion stability index for each concentration of EGF.
FIG. 9E shows a violin plot for the maximum velocity cross-correlation for each concentration of EGF.
FIG. 9F shows a boxplot of mesh disorder index for each concentration of EGF.

Viewing the mesh (see FIG. 9A), shows the boundary position further away from the initial point of contact between the two cell populations and decreased coherence of the boundary with increasing EGF. This is also shown by the shape of the mean normalised strain curve (see FIG. 9B): at 0 ng/ml EGF this curve linearly increases before plateauing around 72 hrs; as EGF concentration increases, the curve becomes more linear and the plateau is lost above 5 ng/ml. The boundary is lost from 0 ng/ml (0.74) to 20 ng/ml (0.46) EGF as the boundary formation index drops below the defined cut-off (0.69). The index at 20 ng/ml EGF is similar to that for EPC2:OE33 without EGF (0.46), (see FIG. 9C). The interface becomes increasingly unstable and cells move more as the motion stability index decreases from 0 ng/ml (0.94, stable) to 20 ng/ml (0.72, unstable) (se FIG. 9D) and the interaction between the two cell populations is lost as the maximum velocity cross-correlation difference before and after gap closure decreased from 0 ng/ml (0.16) to 20 ng/ml (0.04) EGF. The maximum velocity cross-correlation after gap closure is similar to that for EPC2:OE33 (0.02), but the motion stability index differs. Altogether these measures show that above 5 ng/ml EGF the phenotype of EPC2: CP-A becomes similar to that of the interaction between the EAC cell line OE33, EPC2:OE33.

A mesh disorder index was also developed specifically in relation to the MOSES mesh, which showed statistically significant disorder increases with EGF concentration (0 ng/ml: 0.708, 2.5 ng/ml: 0.709, 5 ng/ml: 0.709, 10 ng/ml: 0.713, 20 ng/ml: 0.715) (see FIG. 9F), suggesting the additional loss of collective sheet motion. The effect of increased disorder is visually subtle, but is clearly detected by MOSES. In summary, this example with EGF shows how the experimental system and MOSES permits systematic perturbation and continuous-scale quantification of motion, in a medium-throughput 24-well format.

The experiments described above in relation to FIGS. 7-9 have demonstrated that MOSES, which is based on the method of FIG. 2, can be used to characterise collective cellular motion. In particular, it has been shown that such methods can be used to distinguish between different types of motion, or motion phenotypes. It will now be demonstrated that MOSES can also be used to categorise and classify motion phenotypes as described above in relation to FIGS. 5 and 6. In particular, it will be shown here that the motion signatures for a plurality of videos showing the migration of epithelial cells, can be used to clearly distinguish between different motion phenotypes.

Figure 10:
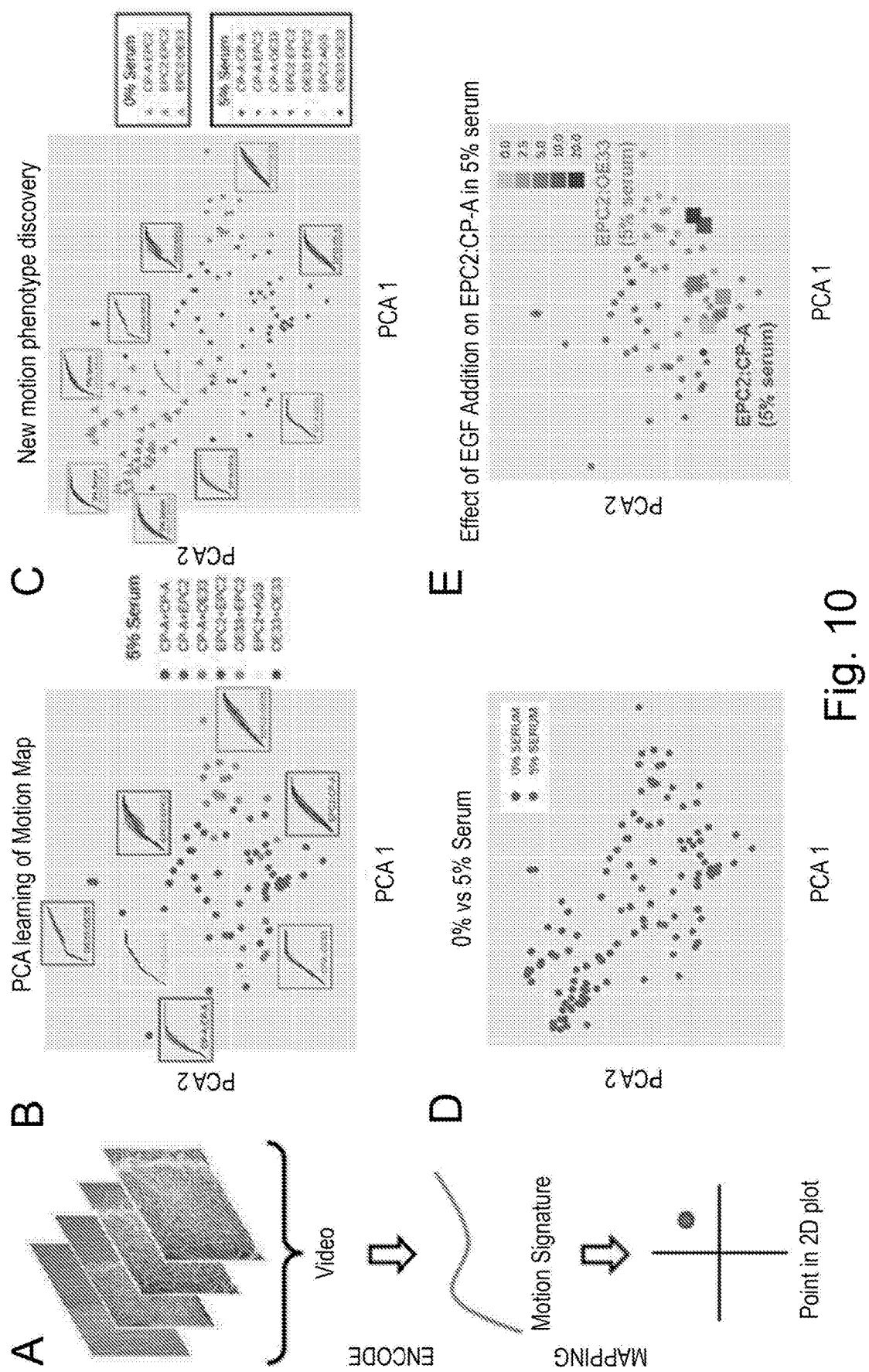
FIG. 10A shows the mapping process for a single video for characterisation of cellular motion phenotypes.
FIG. 10B shows the results of such mappings for the example of epithelial cells and in particular the mean mesh strain curve is plotted for each cell combination.
FIG. 10C shows that these mappings can be used for new motion phenotype discovery.
FIG. 10D shows a motion map in which the 0% and 5% serum samples are highlighted.
FIG. 10E shows the normalised mesh strain curves for 0-20 ng/ml EGF addition to EPC2:CP-A from FIG. 9B plotted onto the same map as defined by the 5% serum videos of the experiment.

The general process for motion map generation is illustrated in FIG. 10A. For each video to be positioned on a 2D map, principal components analysis (PCA) was applied to the normalised mesh strain curves for the 77 videos of cell combinations cultured in 5% serum conditions. The mesh strain curve for each video (used above to define the motion stability index) is used here as a 1D motion signature for summarising the entire video motion. The map generated for these 77 videos (FIG. 10B) shows how this unbiased approach has automatically clustered together the videos for each cell type combination. Furthermore the videos are ordered in a continuous manner, as shown by the progressive transformation in the shape of the mean normalised strain curve when looking across the plot in FIG. 10B from left to right, CP-A:CP-A to EPC2:OE33 (i.e. the shape is increasingly linear).

To demonstrate how 2D motion phenotype maps generated by MOSES can be used to compare videos, the 48 videos from 0% serum cultures were mapped on the same axes as the videos from 5% serum cultures (FIGS. 10C and 10D). The videos from 0% serum mapped to a different area of the 2D plot, whilst preserving the continuous ordering of the previous videos. Therefore, without having watched the videos it is easy to predict that the cells have markedly different motion dynamics in 0% serum compared to 5% serum. Furthermore, since the points for the 5% serum videos cover a larger area of the 2D plot than the 0% serum videos, one would expect less diversity of motion in 0% serum, (FIG. 10D). The motion map can also capture subtle motion changes. This is demonstrated by mapping the mean video motion for each concentration of EGF from 0-20 ng/ml (represented by the respective mean normalised strain curves for each concentration (1 per concentration from total n=40 videos, see FIG. 9B)) onto the same axis as the normal 5% serum videos (square points in FIG. 10E). With increasing EGF, the EPC2:CP-A motion dynamics becomes more similar to EPC2:OE33, as evidenced by the square points moving from the area of blue circular EPC2:CP-A points into the area of orange circular EPC2:OE33 points above 5 ng/ml. Therefore, the motion map is consistent with the results obtained using the specific derived indices (above). These results illustrate that MOSES is able to account for biological and technical variability across independent experiments and possesses the required features for an algorithm to be used in an unbiased manner in a high content screening.

It has therefore been demonstrated that the methods discussed above in relation to FIG. 5 can be used to categorise motion signatures into motion phenotype groups. These motion phenotype groups may, for example, be indicative of disease. By further performing a method such as that described above in relation to FIG. 6, a motion signature for which the underlying dynamics of the objects to which it relates are unknown, can be readily sorted into an appropriate motion phenotype group, which may be useful to, for example, determine that a tissue sample is diseased or abnormal.

The methods for characterising motion described herein will now be illustrated in the context of a second biological example, namely organoid development. It will be demonstrated that the methods described herein may be used to characterise the motion of one or more organoids in a time ordered dataset, and especially to characterise the growth and branching behaviour of organoids.

An organoid is a miniaturized and simplified version of an organ that can be cultured indefinitely in three dimensions in-vitro that is similar to primary tissue in both composition and architecture. Importantly organoids harbour small populations of genomically stable, self-renewing stem cells that can give rise to fully differentiated progeny comprising all major cell lineages at frequencies similar to those in living tissue. They can be derived from one or a few cells from tissue biopsy, embryonic stem cells or induced pluripotent stem cells, which can self-organize and differentiate when cultured in 3D in the presence of an extracellular matrix support. A large library of organoids can now be grown from primary tissue, induced pluripotent cells or embryonic stem cells encompassing numerous body organs including brain, kidney, pancreas, oesophagus, stomach and colon.

To culture and grow organoids from primary tissue, the acquired tissue (usually from biopsies in humans or dissections in mice) is often dissociated into functional sub-tissue units containing stem cells and continually passaged to get single cells and enrichment of the stem cell fraction. Subsequently the mixture is embedded in extracellular matrix (ECM) surrounded by culture medium to initiate organoid culture. The culture is supplemented with organoid specific niche and ECM factors. Stem cells are maintained and perpetuated within the organoids, continually giving rise to differentiated progeny. Typical morphologies are classified as spherical, branching or budding. Organoids can either differentiate spontaneously or be induced to differentiate towards desired lineages or cell types by adding suitable differentiation factors. Whilst successful for growth and maintenance of stem cells, the current culture protocols cannot grow organoids in a controlled fashion scalable to high-throughput multi-well plates. A single well will likely contain tens to hundreds of organoids.

A number of challenges are therefore presented. The presence of the ECM prevents efficient transfection, the depth at which the organoid is located within the matrigel cannot be controlled, and the organoids are sensitive to the continual laser stimulation used in fluorescence imaging over long times and cannot be fully sectioned optically through the entire volume. As a compromise, the grown organoids can be monitored using label-free phase-contrast or DIC (differential interference contrast) microscope over long times (around 2 weeks, potentially unlimited depending on media changes) to monitor their growth and morphogenesis.

The variability of organoid cultures and time-lapse imaging methods present technical challenges for the establishment of automated high-throughput image analysis platforms for organoid screening which can be grouped into specific imaging and analytical challenges, at least some of which are addressed by the methods disclosed herein. For example, large illumination variations between wells, large morphological changes and organoid occlusion combine to make it exceptionally challenging for frame-by-frame image segmentation based on image intensity and texture. At the same time, the typically small number of videos in a screen (96 or 384) limits segmentation based on deep learning approaches. Even suppose perfect frame segmentation of each organoid was possible, the resulting mask would not allow inference of cellular motion within the organoid shape in the resulting 2.5D time-lapse images. The methods disclosed herein address at least some of the analysis challenges mentioned here.

An overview of an automated analysis pipeline for analysing organoids is shown in FIG. 11. Organoid analysis using MOSES is similar to that of the analysis of two migrating epithelial sheets but presents new challenges that may be addressed by further methods. First, the need to acquire time-lapse videos over several acquisitions due to growth medium renewal means that it is advantageous to use automatic image registration to realign frames—in this case established rigid body registration may be applied to correct for translational shift between acquisitions. Second, the presence of multiple organoids in the image data introduces multiple "objects" and so it may be advantageous to be able to distinguish between the superpixels representing each organoid—this is further complicated by the fact that many organoids will grow into each other. Third, the estimation of overall organoid shape frame to frame also poses a challenge. Fourth, the detection and tracking of branching dynamics from the superpixel tracks is also challenging.

Preferably, the imaging field of view contains only a single organoid. However, this is not always possible in practice due to stochastic variation in the resulting spatial placement following dissociation and matrix embedding with current organoid culture protocols. In addition, label-free phase contrast microscopy in contrast to fluorescence microscopy has an image background that captures in addition to the desired organoids, the movement of cell debris and imperfections in the matrix. Naive 'out-of-the-box' motion extraction using optical flow sufficient for monitoring the migration of epithelial sheets now result in noisy motion tracks that are suboptimal for further analysis.

To overcome this limitation each initial motion organoid must be uniquely identified and specific motion tracks assigned to each organoid. This is known as 'instance segmentation' ("where are the individual organoids?") as opposed to 'segmentation' ("Are there organoids in the image?") and is a much more challenging problem. In order to overcome this challenge. the (x, y) position of each organoid is detected in the first frame (which may be considered as the reference data frame) and those organoids that contribute to motion are retained by attempting to match the centres of each organoid with the inferred motion centres from superpixel tracks. Superpixels are subsequently assigned based on analysing the spatial connectivity of moving superpixels. The core steps are illustrated in FIG. 11.

Step 1: Forward and Backward Motion Extraction. The first frame at time $t_0$ is partitioned into a regular number of superpixel regions as described previously and tracked frame-by-frame forward in time from $t_0$ to the final frame $t_T$. The set of (x,y,t) superpixel positions form the forward superpixel tracks. Similarly, the final video frame at time $t_T$ is partitioned into a regular number of superpixel regions and tracked frame by frame backwards from $t_T$ to $t_0$ to extract the set of (x,y,t) superpixel positions to form the backward superpixel tracks. The forward tracks reveal where motion moves towards or 'motion sinks', (see FIG. 11A, step 1, left), whereas the backward tracks reveal where motion originates or 'motion sources', (see FIG. 11A, step 1, middle), in analogy to fluid flow. Combined they describe the full range of dynamic motion in the movie as can be visualised in one image using the maximum projection of the video frames (FIG. 11A, step 1, right).

Step 2: Segment Initial Frame and Match to Motion Centres. The initial frame is segmented to identify each organoid of a minimum size (specified by the number of pixels), (see, FIG. 11A, step 2, middle). Each dataset used specific settings for segmentation. To infer a likelihood image of possible motion centres, the MOSES saliency map from the radius neighbour graph, $$W_{ball, r \leq 5w_s}^{S_i(x,y,t)},$$

where $w_s$ is the average superpixel width is computed. A local maximum filter (disk kernel, 2 $w_s$) is applied to the result followed by non-maximum suppression, setting all pixels that are not a local maximum within a local circular neighbourhood of $w_s$ pixels to 0, (see FIG. 11A, step 2, right). Organoids are assigned to motion centres if their respective centroids differ no more than a distance given by a specified constant multiple of the equivalent organoid radius (see FIG. 11A, step 2). Organoids not matched to a motion centre are regarded as not moving and removed from consideration.

Step 3: Superpixel Assignment and Track Propagation. Determine the set of initially moving superpixels, $S_{move}^{t_0}$ defined as those superpixels whose summed displaced distance between successive frames from the initial frame $t=t_0$ to the frame of movement $$t_m, \left\{ \sum_{t=t_0+1}^{t_m} |r(x_t, y_t) - r(x_{t-1}, y_{t-1})| \right\} > 0 \cdot t_m$$

is automatically determined for each video defined as the smallest frame number $t_m = \min(1, t_{move})$, that satisfies $t_{move} = \arg\min_t F[t] = (\Sigma_{i=1}^t d[i]) > d_c$, for $$i = 1, 2, \ldots, t, d[i] = \left(\frac{1}{N}\right) \sum_{j=1}^{N} |r_j(x_i, y_i) - r_j(x_{i-1}, y_{i-1})|,$$

$r_j(x_i, y_i)$ is the (x,y) position of superpixel j at time frame i and $d_c$ is a cut-off distance selected by the user. F[t] is the cumulative mean displacement between frames from the initial frame 0 to frame number, t. Form the region adjacency graph (RAG) between $S_{move}^{t_0}$ using the initial (x, y) superpixel positions in the initial frame at $t=t_0$. Identify connected components of the RAG. Connected components are defined as a subgraph whose any two vertices or nodes are connected to each other by an edge but is connected to no other vertices outside of the subgraph belonging to the larger graph. Thus a graph whose nodes are fully connected has only one connected component. Each retained organoid centre is assigned to a graph component (see FIG. 11A, step 3, left). If more than one organoid centre is assigned to a graph component, each superpixel point is assigned to the nearest organoid centre according to Euclidean distance (see FIG. 11A, step 3, left). This assignment may be semantically refined through pairwise 2-component GMM (Gaussian mixture model) clustering on the PCA dimensionally reduced superpixel tracks. Each organoid, $O_i$ now has associated a unique set of superpixels $S_{initial}^{O_i} \subseteq S_{move}^{t_0} \subseteq S$ whose tracks in time capture the dynamic motion of that organoid. However, only the superpixels that were initially moving were considered in the assignment. There is a high probability of superpixels that initially do not move but become 'activated' as the organoids grow in size similar to the migration of the epithelial sheets. To improve the accuracy of the full dynamic capture for each organoid $O_i$, one additionally augments $O_i$ with the subset $S_{activate}^{O_i}$ which are superpixels that are a member of $S_{no\ move}^{t_0} = S \backslash S_{move}^{t_0}$ but become 'activated'; where the initial $(x_0, y_0)$ position of $S_j(x_t, y_t) \in S_{activate}^{O_i}$, $S_j(x_0, y_0)$ is within the total area $\Omega^t := \{\omega_1^t, \omega_2^t, \ldots, \omega_k^t\}$, the concatenation of the individual areas $\omega_k^t$ of each k superpixel over all time t in $S_{initial}^{O_i}$. The final set of superpixels and associated tracks that capture the dynamic motion of organoid $O_i$ is the union of the initial and activated superpixels, $S^{O_i} = S_{initial}^{O_i} \cup S_{activate}^{O_i}$, (see FIG. 11A, step 3, right).

Step 4: Outlier Removal. When organoids are close spatially initially or become close during filming through growth or movement or if the initial segmentation or motion inference is inaccurate there is high probability of some misassigned tracks, (see FIG. 11A, step 3, right) though most of the assigned tracks are correct. The presence of these 'outlier' tracks affects downstream analysis such as branch detection (see below) and should be filtered out. This can be efficiently achieved by exploiting the idea of point density to find the total spatial range of motion and use this to remove outlier superpixel tracks whose motion is not constrained within this range. For organoid $O_i$ described by $n_s$ superpixel tracks $S^{O_i}$ collapse the time t and superpixel identity k to form the super point set, $P^{O_i} := \{(x_i, y_i) | (x_t, y_t, k) \rightarrow (x_i, y_i)\}$, $i=1 \ldots, N\}$ where $N=K \times T$ is the total number of points, for K superpixels and T video frames. Then map the full point set P into a spatial image, $I_p$ whose pixel values at (m,n) where m, n are the row and column indices is the number of points at that location:

$$I_P(m, n) = \begin{cases} \sum_{i'=1}^{N} 1_{x_{i'}, y_{i'}}, & \text{if } y_{i'} = m, x_{i'} = n \\ 0, & \text{otherwise} \end{cases}$$

The resulting image is sparse relative to the number of image pixels, depending on the initial number of superpixels specified. The image $I_p$ is smoothed with a Gaussian kernel ($\sigma = 2w_s$) and binarised automatically by 3 cluster K-means (retaining the highest intensity 2 clusters) to produce a binary mask, whose largest connected component is retained to capture the dynamic motion range. Each superpixel track k, $S_k(x_t, y_t) \in S^{O_i}$ is assigned a reliability score (which may be defined in any suitable way). A superpixel track may be defined as reliable (and therefore kept) if its reliability score is above a threshold.

Following on from these steps, appropriate superpixels for monitoring the motion of each organoid in a plurality of time ordered images/frames are identified. Meshes can then be defined for each frame, and a motion signature can be defined.

The final superpixel tracks isolate the motion of individual organoids and partitions the movement spatially. Plotting the organoid superpixel tracks in different colours from the initial time $t = t_0$, frame 0 to frames 100 to 400, the superpixel tracks record the time history of the motion, providing easy visualization of the number of organoids and their movement in one static image which could not be easily inferred from a single or a few frames, (see FIG. 11B).

In cases where the predominant motion of the organoid is growth, the superpixel tracks allows for inference of the individual organoid morphology. Both identification of the external shape as well as tracking of the individual branching dynamics as the organoid develops can be achieved to allow further analysis.

Precise segmentation of the external organoid shape frame-by-frame from sparse superpixel tracks is difficult where the organoid is represented by a much larger number of pixels than the fixed number of superpixels used for motion extraction. Nevertheless, the spatial distribution of the superpixels from forward and backward tracking can provide an estimation of the organoid shape comparable to pixel-based image segmentation. The basic workflow is as follows:

- Given a time frame t (t>0), concatenate the forward and backward superpixel positions $S^F(x_t, y_t), S^B(x_{-t}, y_{-t})$, to form the combined point set $P^{FB}(x_t, y_t) = S^F(x_t, y_t) \cup S^B(x_{-t}, y_{-t})$.
- Gaussian kernel density estimation with automatic bandwidth selection using Scott's Rule is applied to estimate the 2D probability distribution of the set $P^{FB}(x_t, y_t)$, generating a dense spatial heatmap (motion saliency map) for visualization.
- The heatmap is binarised using 3 class K-means and retaining the highest intensity class to estimate the organoid shape with a binary mask.

Figure 12:
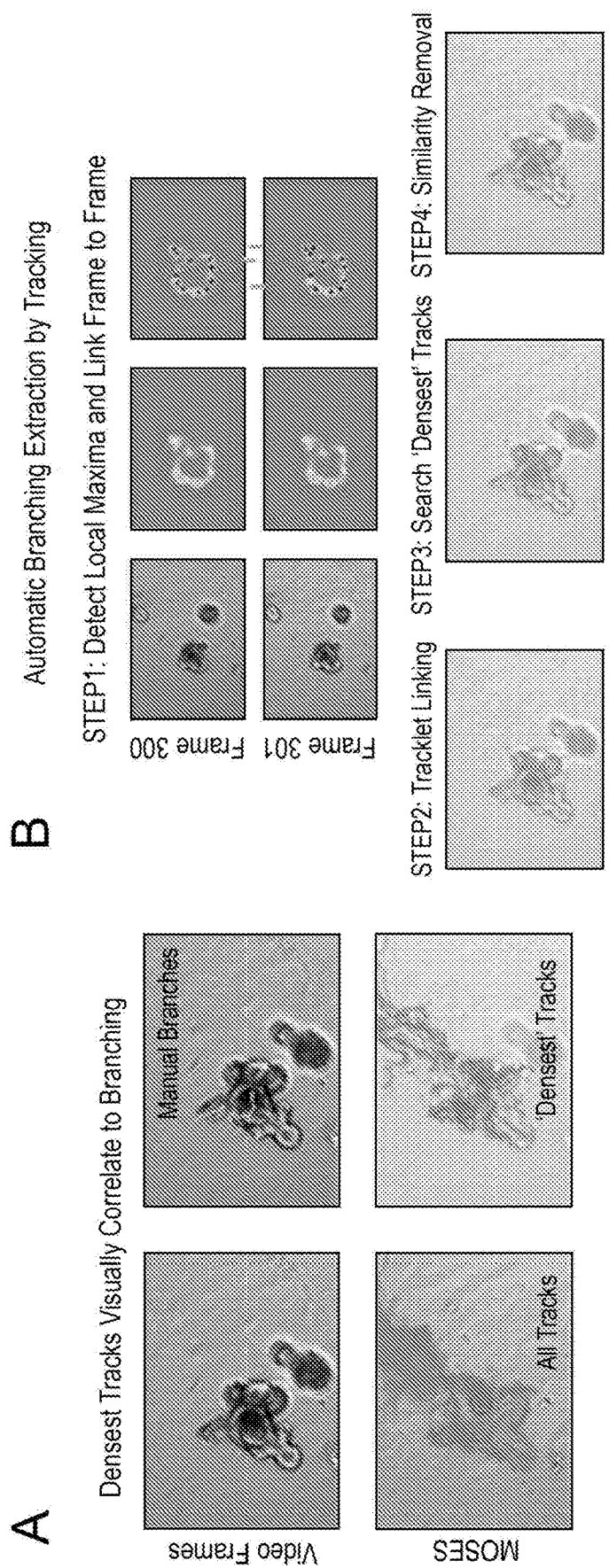
FIG. 12A shows a snapshot of a frame showing the final organoid branch shape in an experiment performed by the inventors, with and without the overlay of manually tracked branches.
FIG. 12B shows an overview of a computer-implemented method for branch extraction for organoids.

The set of organoid superpixel tracks, $S_i^O$ not only captures the overall shape of organoid $O_i$ but additionally captures information about the developmental dynamics of branching. Visually it can be seen manual annotation of organoid branches is positively correlated to the number of tracks passing through the same spatial region of interest, (see FIG. 12A). Tracks in this spatial zone are termed 'densest' tracks. Conceptually, branching can be viewed as a locally accelerated expansion of a group of budding cells compared to its neighbours and this appears to be captured in the superpixel motion tracks. In organoids that experience pure growth, the 'densest' tracks can recover the branching dynamics. For example, in FIG. 12A the densest colours appear to map the developmental path of the branches. In organoids of pure movement, the 'densest' tracks provide a compact summary of the motion pattern. For fair comparison of branching dynamics, a method of automatic filtering is used based on the angular spread of motion (growing organoids grow in all directions) and by shifts in the organoid centroid.

Based on the empirical observation connecting organoid branching with the spatial location of greatest motion tracks, a computer-implementable automatic branch extraction method was developed.

Step 1: Detect Local Maxima and Link Frame to Frame. For frames 1 to T (the final video frame), a heatmap localising the spatial region with the densest number of superpixels is given by the radius neighbour mesh MOSES saliency map ($r \leq 1w_s$) constructed from the forward superpixel tracks. Peaks given by (x,y) coordinates are identified using a local maximum filter and linked frame-to-frame using a nearest neighbour approach. If a track cannot be linked to a point in the next frame, it is terminated. Points that could not be linked to a point in the previous frame are initiated as new tracks.

Step 2: Tracklet Linking. The frame-to-frame linking process produces a series of tracks of varying time lengths termed tracklets. After discarding very short tracklets, tracklets are grouped according to their start time and groups are sorted by time in ascending order. Starting from the first group, tracklets are tested successively for linking based on distance i.e. if the last location of tracklet A in group 1 is within a threshold distance of the first location of tracklet B they are determined to be linked. To link tracks, a new track is produced with the start time of tracklet A and the end time of tracklet B. Where tracklet A and tracklet B overlaps in time, the mean of the two positions is computed. Tracklets that cannot be linked with any track in the next group are deemed to be unique and not considered for further linking. This linking process is useful to combine tracklets that belong to a longer track but that are not identified in every frame due to image artefacts such as occlusion disrupting the motion signal.

Step 3: Search the Set of 'Densest Tracks'. The resultant tracks, $T_{link}$ based on maxima detection and tracklet linking may result in shorter or longer tracks than expected depending on the quality of the linking which can vary from video to video, (see FIG. 12B, step 2). Further it may not agree with the motion captured in the superpixel tracks. Instead the $T_{link}$ can be viewed as 'queries' to retrieve the most representative track from the set of densest tracks, $D_{tracks}$ which we can view as a pool of 'templates'. The measure for retrieving the most similar track for track $T_i$ is to select the track $T_j \in D_{tracks}$ that minimises the mean Euclidean distance between $T_i$ and $T_j$.

Step 4: Removal of 'Similar' Tracks. The resultant tracks may contain tracks with similar shape that overlap spatially or tracks whose end positions colocalise. These tracks with high probability belong to the same organoid branch and should be described by a single representative track.

It has therefore been shown that the motion of one or more organoids, and particularly the growth and branching characteristics of the one or more organoids, can be captured by identifying the locations of chosen superpixels in each of the frames of the video. Meshes may be defined, for example the MOSES mesh or the Radial Neighbours mesh for each frame of the video, and a motion signature may then be defined for the video, the motion signature characteristic of the motion of the organoid within the video.

Figure 13:
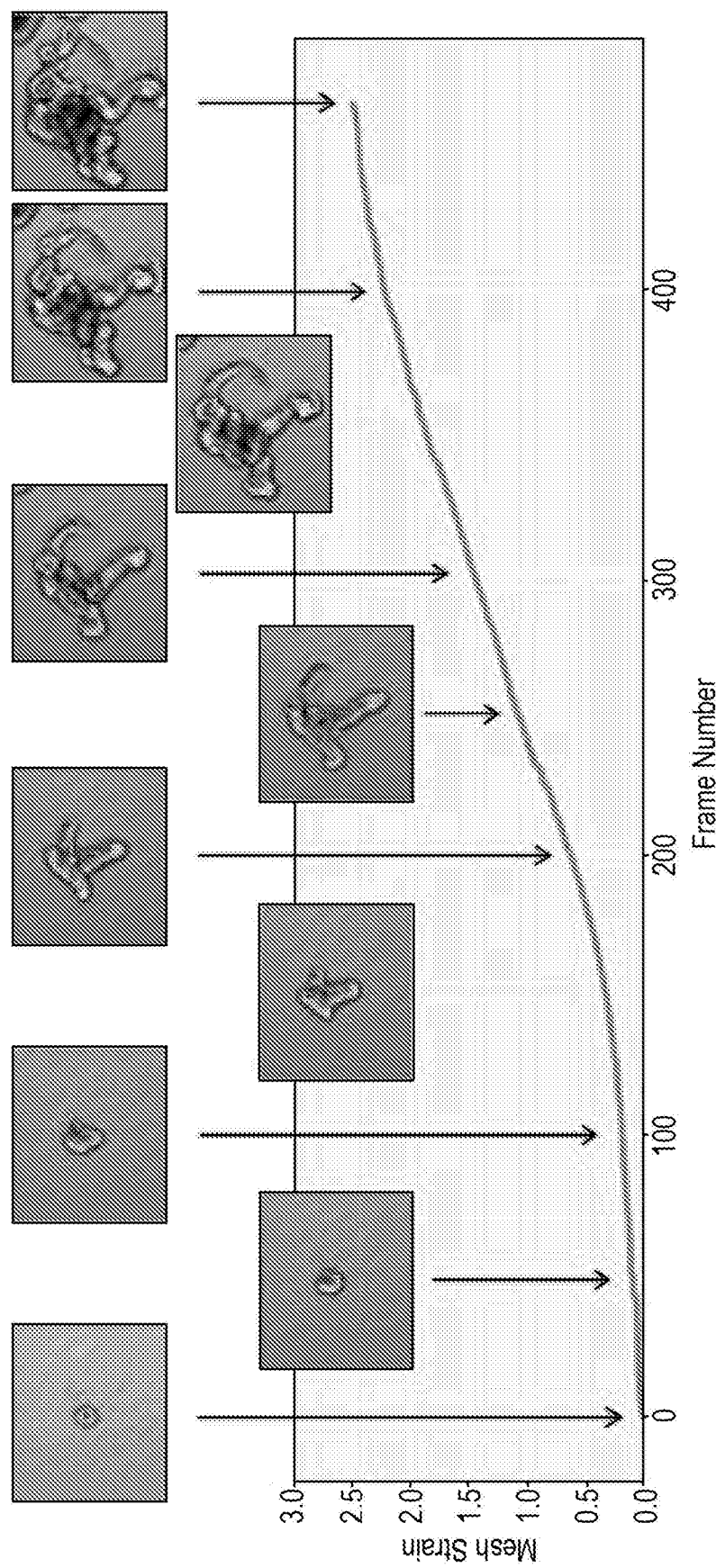
FIG. 13 shows a graph of the MOSES strain curve for a video of an organoid with static video snapshots provided at indicated frame numbers.

One such motion signature that may be derived for organoid development is the MOSES strain curve (defined above). FIG. 13 shows a MOSES strain curve for an organoid with static video snapshots at the indicated frame number. The MOSES strain curve therefore characterises the growth and the branching characteristics of the organoid(s) of the corresponding video.

Figure 14:
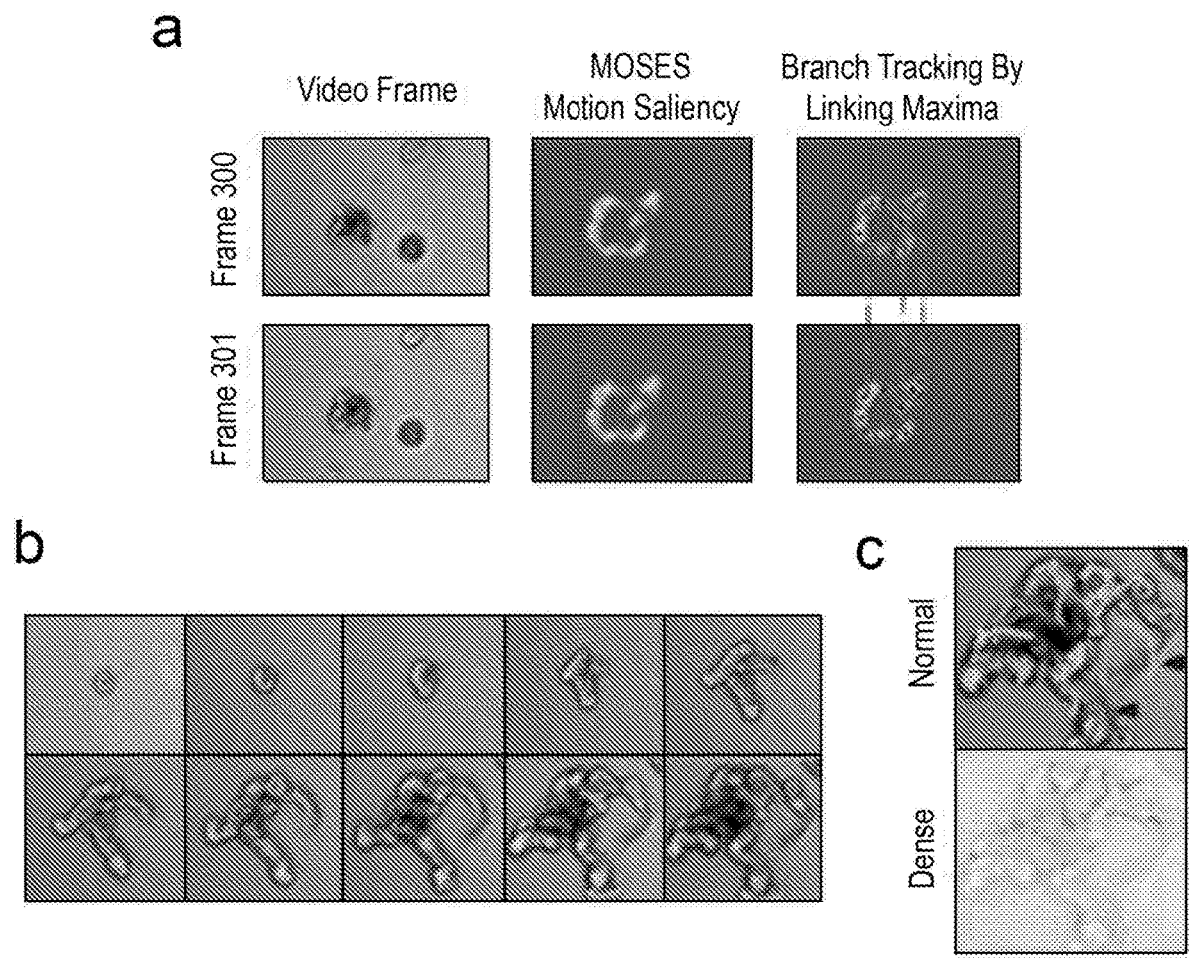
FIG. 14 shows tracking of branching behaviour of organoids using both a dense mode and a non-dense mode of MOSES.

When operating in a "dense" mode, MOSES initially seeds superpixels in an initial frame in order to track a motion. MOSES then continuously maintains coverage over the entire image by automatically introducing new superpixels. In particular, new superpixels are automatically introduced into the image whenever an area is no longer covered by an existing superpixel. This allows motion to be tracked continuously over an entire captured area for the length of a video. FIG. 14 shows tracking of branching behaviour of organoids using both "dense" mode and a non-dense ("normal") mode of MOSES. Part A of FIG. 14 shows branch tracking by finding and linking together local maxima in successive frames. The maxima can be tracked through time based on spatial proximity, using a motion saliency map. This can be used to extract branches even when they occlude each other due to their proximity. Part B of FIG. 14 shows the organoid changes at 50 frame intervals. The triangles in part C of FIG. 14 highlight false positive tracks which are detected by a normal mode, but which are not detected by a dense mode.

MOSES may also stop tracking superpixels according to an automatic extinction criteria, which comprises checking for similarity in the appearance of a superpixel from a first frame to a second frame, so as to ensure that the same object or cell is continuously tracked. When the object or cell is no longer the same, such that similarity is not found, the superpixel will stop being updated.

MOSES may derive a mesh strain vector as a motion signature. The mesh strain vector is the resultant displacement vector of a superpixel after summing all individual displacement vectors to each connected neighbouring superpixel. Part A of FIG. 15 illustrates the calculation of a mesh strain vector for a superpixel. The mesh strain retains both the magnitude of movement in the mesh and the directionality of the movement. Part B of FIG. 15 shows a comparison of mesh strains and velocity vectors, in which the mesh strain vector is more stable.

Figure 16:
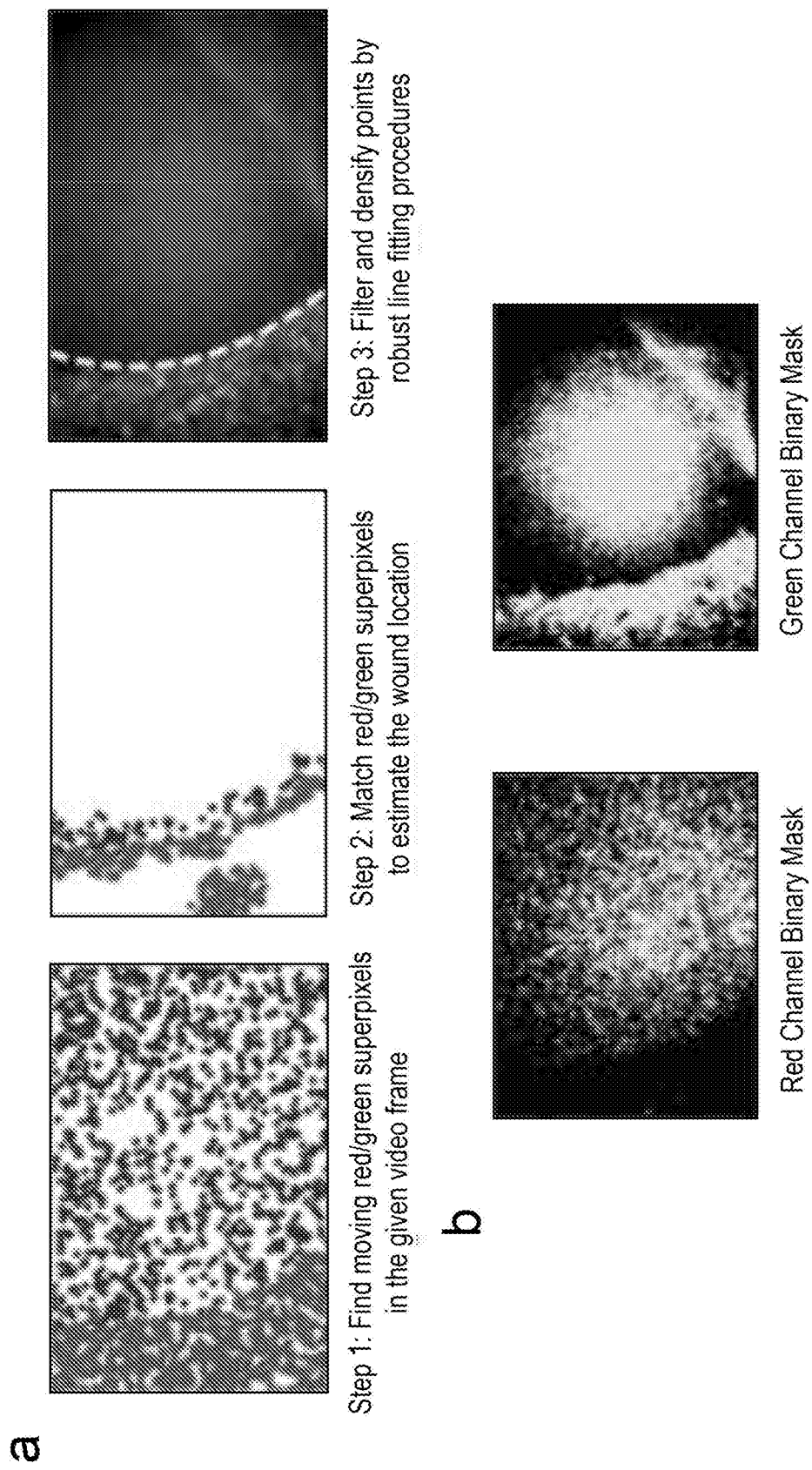
FIG. 16 shows boundary extraction using MOSES generated superpixel tracks.

Superpixels created by MOSES can be used to estimate boundaries between populations. Part A of FIG. 16 shows boundary extraction using MOSES generated superpixel tracks. In step 1 two populations of superpixels are identified at a time $t=t_0$. Superpixels which are not moving are then filtered. This can be done by filtering superpixels which have not moved from their previous position at $t=t_1$, or which have not moved more than a threshold distance from their previous position. A windowed smoothing may be applied to the movement of the superpixels at this stage. In step 2 superpixels which have not been filtered are matched. To do this, superpixels from different populations are matched when they are closer than a predetermined distance. In step 3, line fitting is used to identify the boundary, using asymmetric least square filtering and spline fitting, for example. Where MOSES is used to track cell migration around a wound, the resultant line may be used to identify the site of the wound.

Figure 17:
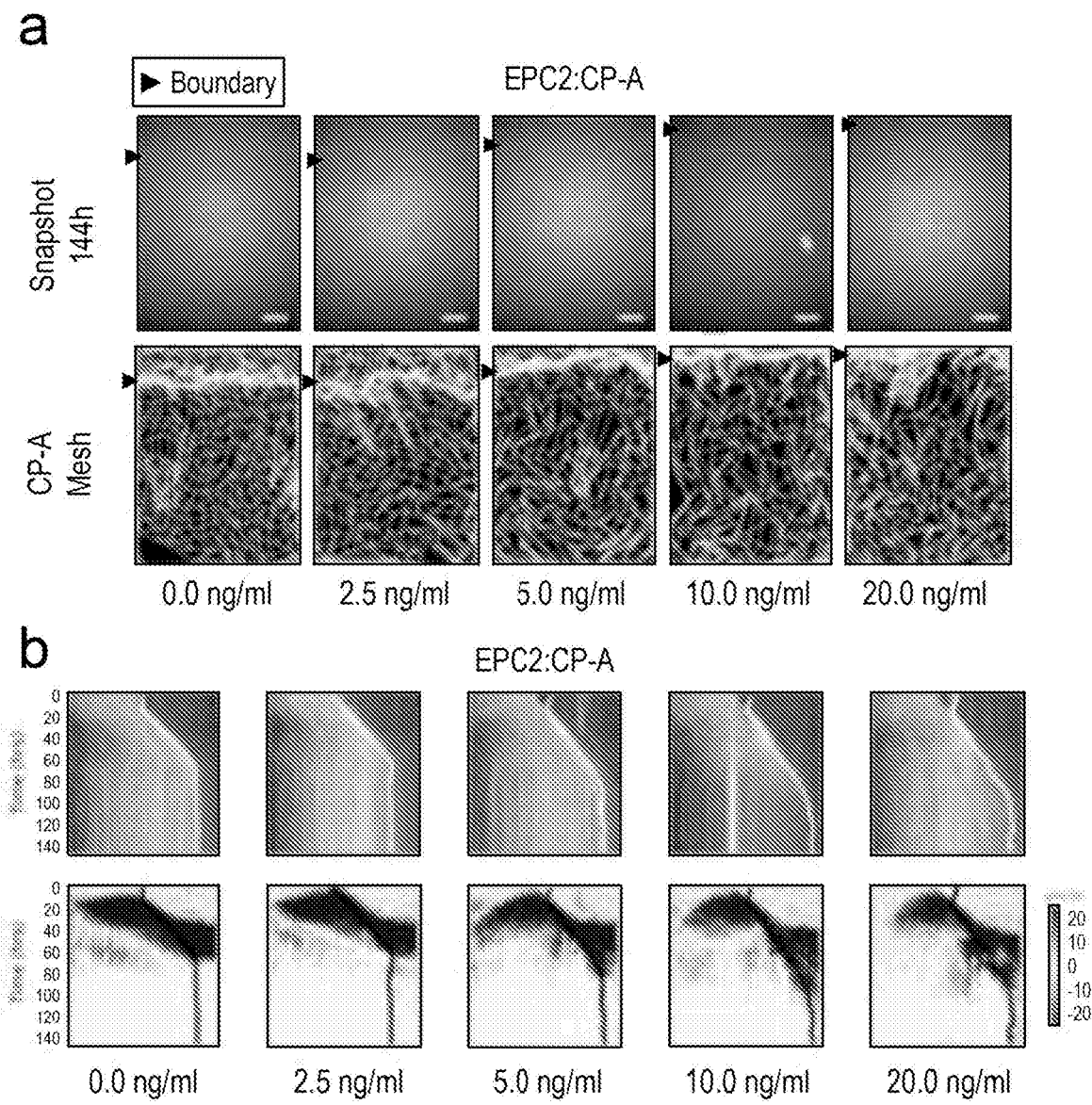
FIG. 17 shows kymographs generated using MOSES.

A kymograph can be used to summarise a video sequence using a single image. This can be done either by taking a cross-section of the video sequence or by projecting the two-dimensional spatial frames into one-dimensional lines, for example by returning the median, maximum or average image intensities along the y-axis at each x position. In MOSES, superpixels are not necessarily defined at every pixel position. Therefore, in order to produce a kymograph using superpixels, the space axis is discretised into finite size bins. By the Nyquist Sampling Theorem, the number of bins should be specified to be at least 2 times the number of unique x coordinates of the initial superpixel positions FIG. 17 shows example kymographs generated using MOSES. Part A of FIG. 17 shows snapshots and meshes. The images suggest an increasing wound displacement, with increasing EGF concentration, but it may be unclear whether the two cell populations just met. Part B of FIG. 17 shows corresponding maximum intensity image kymographs and median projected velocity kymographs, with a wound boundary derived from MOSES superpixel tracks overlaid.

Figure 18:
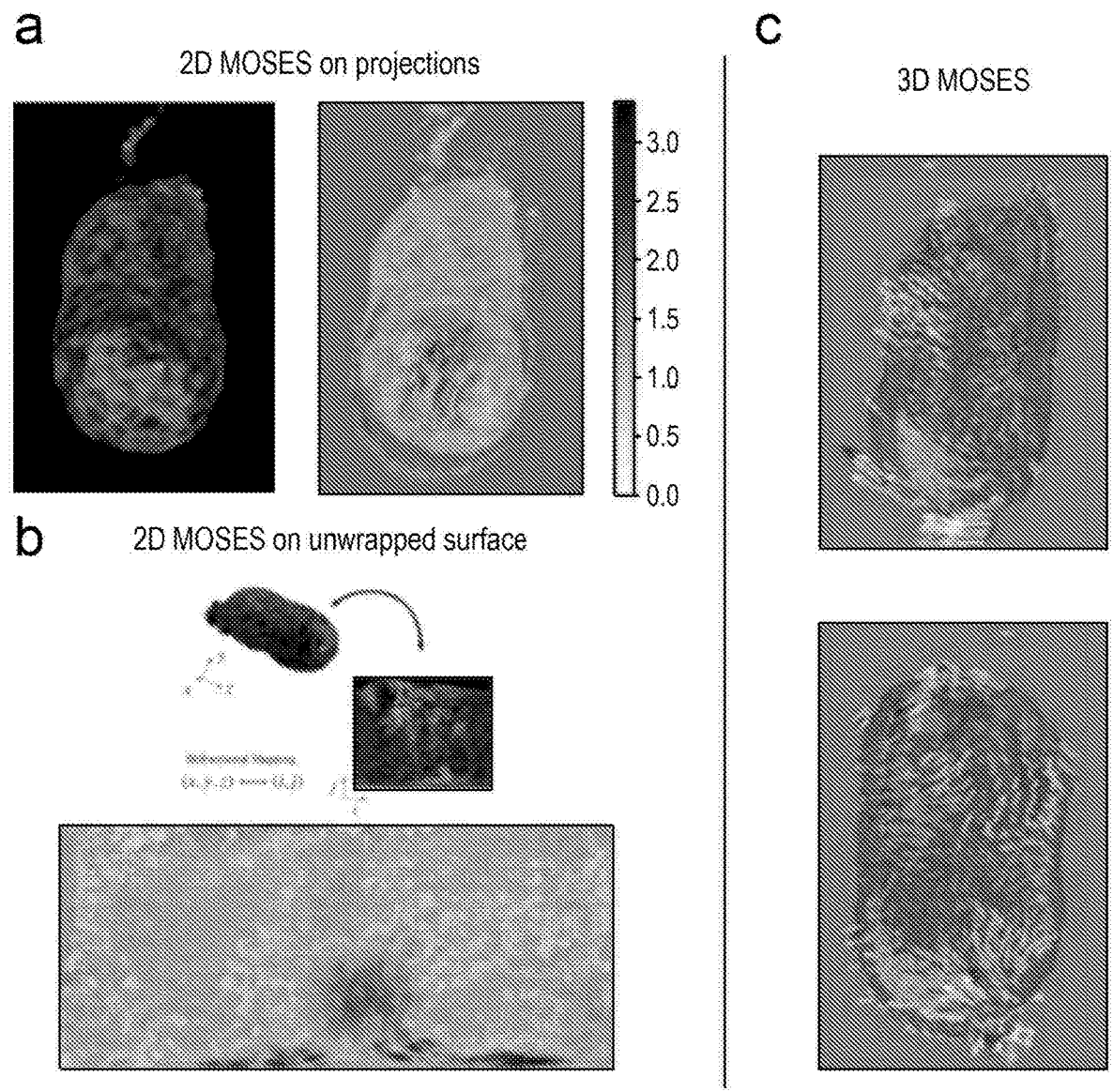
FIG. 18 shows the use of MOSES with data that has three spatial dimensions.

As is noted above, MOSES can be used with data that has three spatial dimensions, so that the image patches comprise supervoxels. FIG. 18 shows such an embodiment, using a time-lapse dataset of mouse embryo development which was acquired with lightsheet fluorescence microscopy. During mouse embryo development a specific group of cells, the AVE cells, migrate unidirectionally from the bottom of the embryo to one side of the embryo. Part A of FIG. 18 shows the result of MOSES applied to two-dimensional time-lapse projection of the three-dimensional embryo. Part B of FIG. 18 shows the result of MOSES applied to unwrapped outer surface time-lapse projections of the three-dimensional embryo. Part C of FIG. 18 shows the result of using supervoxels in three-dimensions using three-dimensional optical flow computed motion fields. All three parts show the expected migration of AVE cells.

Using the three-dimensional data can reduce biases which may be introduced by the projection of three-dimensional spatial data into a two-dimensional format. It is also easier to compute than the expensive and less accurate procedure of using three-dimensional and time cell segmentation and single cell tracking.

Further variations to the methods and apparatuses described herein are envisaged. For example, the methods described herein may be combined in any suitable way.

For example, two example biological settings (epithelial cell sheets and organoids) have been discussed in order to demonstrate the methods described herein for characterising the motion of one or more objects in a time ordered image dataset. However, the skilled person will appreciate that the methods described herein are applicable in other biological settings in which it is useful to characterise the motion in a time ordered dataset, from the analysis of development in *drosophila* embryos to the immunosurveillance of zebrafish.

The skilled person would also appreciate that the method described herein may be used to analyse motion in non-biological settings in which time ordered image datasets are available. It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for characterizing motion of one or more objects in a time ordered image dataset comprising a plurality of time ordered data frames, the method comprising:
    selecting a reference data frame from the plurality of time ordered data frames;
    extracting a plurality of image patches from at least a part of the reference data frame by equipartition of the part of the reference data frame;
    identifying a location of each image patch of at least a subset of the plurality of image patches in each data frame;
    defining, based on the identified locations, a mesh for each data frame, wherein vertices of each mesh correspond to respective identified locations of image patches in the corresponding data frame, wherein each mesh is defined by a respective weighted graph, and wherein each vertex of the respective weighted graph is connected to each of other vertices within neighborhood thereof by a corresponding edge, the edge weighted by a distance between the vertex and each of the other vertices; and
    deriving, from the meshes, a motion signature for the time ordered image dataset, the motion signature characteristic of the motion of the one or more objects in the plurality of time ordered data frames, wherein the step of deriving the motion signature comprises calculating, for each mesh, the average displacement of the vertices of the mesh from the corresponding vertices of the reference mesh by global motion extraction.

2. The method according to claim 1, wherein the reference data frame is the first data frame of the plurality of time ordered data frames.

3. The method according to claim 1, wherein the reference data frame is the last data frame of the plurality of time ordered data frames.

4. The method according to claim 1, further comprising:
    identifying at least one location in at least one data frame other than the reference frame wherein the location is not covered by an image patch extracted from the reference data frame;
    extracting at least one further image patch from the at least one identified location by equipartition of the at least one identified location;
    identifying a location of each image patch of at least a subset of the at least one further image patches in at least one data frame;
    defining, based on the identified locations of the image patches, a mesh for each data frame of the plurality of time ordered data frames, wherein vertices of each mesh correspond to respective identified locations of image patches in the corresponding data frame; and
    deriving, from the meshes, a motion signature for the time ordered image dataset, the motion signature characteristic of the motion of the one or more objects in the plurality of time ordered data frames.

5. The method according to claim 1, wherein the step of identifying comprises comparing an image patch in first data frame with the same image patch in a second frame and, where the image patch is not similar in appearance in the two frames, not identifying a location of the image patch for the first data frame.

6. The method according to claim 1, wherein the time ordered image dataset comprises a plurality of time ordered images, and wherein the reference data frame comprises a reference image.

7. The method according to claim 6, wherein the plurality of time ordered images comprises a video, each image comprising a frame of the video.

8. The method according to claim 6, wherein the method further comprises capturing the plurality of time ordered images.

9. The method according to claim 6, wherein the plurality of time ordered images is a plurality of time ordered images of a living biological cell sheet, and wherein the motion signature for the plurality of time ordered images is characteristic of cellular motion in the living biological cell sheet.

10. The method according to claim 9, wherein the motion signature of the cell sheet is indicative of disease.

11. The method according to claim 9, wherein the cell sheet comprises at least two cell types.

12. The method according to claim 9, wherein the cell sheet comprises epithelial cells.

13. The method according to claim 6, wherein, for each of the plurality of time ordered images, edges of the defined mesh correspond to spatial separations of image patches that are within a predetermined distance of one another in the reference image.

14. The method according to claim 13, wherein the step of deriving comprises determining a parameter for each of the defined meshes based on a comparison of each defined mesh to the mesh defined for the reference image.

15. The method according to claim 14, wherein each parameter comprises an average displacement of the identified locations of image patches in the corresponding image from the identified locations of the image patches in the reference image.

16. The method according to claim 6, wherein, for each of the plurality of time ordered images, edges of the defined mesh correspond to spatial separations of image patches that are within a predetermined distance from one another in the corresponding image.

17. The method according to claim 1, wherein each image patch comprises a superpixel.

18. The method according to claim 1, wherein each of the one or more objects comprises an organoid.

19. The method according to claim 18, wherein an image patch corresponds to an organoid.

20. The method according to claim 18, wherein the motion signature is indicative of growth of one or more organoids.

21. The method according to claim 18, wherein the motion signature is indicative of a branching dynamic of one or more organoids.

22. The method according to claim 1, wherein the time ordered image dataset comprises a three-dimensional image dataset.

23. The method according to claim 22, wherein each image patch comprises a supervoxel.

24. The method according to claim 1, wherein the time ordered image dataset comprises a multimodality dataset.

25. The method according to claim 24, wherein the multimodality dataset comprises a video-audio dataset.

26. The method according to claim 1, wherein each vertex of the respective weighted graph has a corresponding vertex weight.

27. The method according to claim 26, wherein the vertex weight for each vertex of the respective weighted graph is defined by the average change, with respect to a reference weighted graph of the reference data frame, in distance between the vertex and each other vertex in its neighborhood.

28. The method according to claim 27, wherein the neighborhood of each vertex of the respective weighted graph for each data frame, is the same as the neighborhood of that vertex in the reference weighted graph of the reference data frame.

29. The method according to claim 28, wherein the step of deriving comprises averaging, for each mesh, the vertex weights of all of the vertices of the mesh.

30. The method according to claim 28, wherein the step of deriving comprises producing a motion saliency map for each image from the defined mesh, the motion saliency map produced by mapping the vertex weights of each vertex of each mesh to the respective identified location of the image patch corresponding to that vertex in each data frame, and temporally averaging over at least a subset of the plurality of time ordered data frames.

31. The method according to claim 30, wherein the step of deriving comprises deriving a boundary formation index from the motion saliency map, the boundary formation index indicative of whether a boundary exists between the two types of cells.

32. The method according to claim 27, wherein the neighborhood of each vertex of the respective weighted graph for each data frame comprises the k nearest vertices to that vertex, wherein k is an integer.

33. The method according to claim 32, wherein the vertex weight for each vertex of the respective weighted graph is defined by the number of vertices within the neighborhood of that vertex.

34. The method according to claim 1, wherein the step of deriving comprises a resultant displacement vector of an image patch after summing all the individual displacement vectors of all neighboring image patches.

35. The method according to claim 1, wherein the step of identifying comprises identifying the location of the at least a subset of image patches based on a mean displacement of image patches calculated from optical flow.

36. The method according to claim 1, wherein the step of identifying a comprises identifying the location of the at least a subset of image patches based on a median displacement of image patches calculated from optical flow.

37. The method according to claim 1, wherein the step of identifying comprises identifying the location of the at least a subset of image patches based on a weighted average displacement of image patches calculated from optical flow.

38. A non-transitory computer readable medium having instructions stored thereon which, when executed by a processor of a computing device, causes the computing device to carry out the method of claim 1.

39. An apparatus for characterizing motion of one or more objects in a time ordered image dataset comprising a plurality of time ordered data frames, the apparatus comprising:
 a memory; and
 a processor configured to cause the apparatus to carry out the method of claim 1.

40. The apparatus according to claim 39, further comprising:
 a camera for capturing the plurality of time ordered images.

* * * * *